United States Patent
Bonin et al.

(10) Patent No.: US 10,060,725 B2
(45) Date of Patent: Aug. 28, 2018

(54) SCANNING LASER RANGE FINDER WITH SURFACE TEMPERATURE MEASUREMENT USING TWO-COLOR PYROMETRY

(71) Applicants: Michel Pierre Bonin, Danville, CA (US); Thomas Lawrence Harvill, Alamo, CA (US); Alan Stanley Alsing, El Sobrante, CA (US)

(72) Inventors: Michel Pierre Bonin, Danville, CA (US); Thomas Lawrence Harvill, Alamo, CA (US); Alan Stanley Alsing, El Sobrante, CA (US)

(73) Assignee: PROCESS METRIX, Pleasanton, CA (US)

( * ) Notice: Subject to any disclaimer, the term of this patent is extended or adjusted under 35 U.S.C. 154(b) by 110 days.

(21) Appl. No.: 15/356,599

(22) Filed: Nov. 20, 2016

(65) Prior Publication Data
US 2018/0143004 A1    May 24, 2018

(51) Int. Cl.
*G01J 5/60* (2006.01)
*G01B 11/06* (2006.01)
*G01J 5/08* (2006.01)

(52) U.S. Cl.
CPC ............ *G01B 11/06* (2013.01); *G01J 5/0806* (2013.01)

(58) Field of Classification Search
CPC .............................. G01B 11/06; G01J 5/0806
USPC .......................................................... 356/45
See application file for complete search history.

(56) References Cited

U.S. PATENT DOCUMENTS

| | | | |
|---|---|---|---|
| 5,715,328 A | 2/1998 | Tsukijara | |
| 5,730,528 A * | 3/1998 | Allison | G01K 11/20 250/459.1 |
| 8,958,058 B2 | 2/2015 | Bonin | |
| 9,279,773 B2 | 3/2016 | Harvill | |
| 9,435,889 B2 | 9/2016 | Bonin | |
| 2004/0227928 A1* | 11/2004 | Bonne | G01J 5/48 356/43 |
| 2011/0069301 A1 | 3/2011 | Marzok | |
| 2013/0120738 A1* | 5/2013 | Bonin | G01N 25/72 356/72 |

(Continued)

FOREIGN PATENT DOCUMENTS

| | | |
|---|---|---|
| EP | 1473350 A1 | 11/2004 |
| JP | 2009294108 A | 12/2009 |

OTHER PUBLICATIONS

LaCam—Fast, accurate, reliable laser scanner for hot surface applications, Ferrotron, internet presentation, Feb. 25, 2014.

(Continued)

*Primary Examiner* — Sunghee Y Gray
(74) *Attorney, Agent, or Firm* — Thomas Clinton; Donald M. Satina

(57) ABSTRACT

Apparatuses, methods, and systems are disclosed to characterize the wear and measure temperature of a surface of a lining of a metallurgical container. Wear characterization is accomplished by a scanning device by making thickness measurements of the lining and surface temperature measurements are made using a two-color pyrometer integrated with the scanning device where surface temperature is measured by correlating a ratio of two light intensities to the surface temperature. A controller controls operation of the scanning device and the two-color pyrometer.

18 Claims, 18 Drawing Sheets

(56) References Cited

U.S. PATENT DOCUMENTS

2016/0018341 A1\* 1/2016 Harvill ................ G01B 11/303
  356/240.1
2016/0273907 A1\* 9/2016 Bonin ................ G01B 11/0616

OTHER PUBLICATIONS

Laser Measurement System for the Refractory Lining of Hot Torpedo Ladles, Rolf Lamm, AIST.org, Iron & Steel Technology, Mar. 1, 2013.
Understanding Modern Infrared Pyrometers for Demanding Steel Mill Applications, Tom Larrick, Williamson Corporation, Concord, MA, Oct. 18, 2013.

\* cited by examiner

FIG. 14

SCANNING LASER RANGE FINDER WITH SURFACE TEMPERATURE MEASUREMENT USING TWO-COLOR PYROMETRY

BACKGROUND

Technical Field

Embodiments of the subject matter disclosed herein relate generally to apparatuses, methods and systems and, more particularly, to devices, processes, mechanisms and techniques for measuring refractory surface wear and surface temperature in metallurgical vessels.

Description of Related Art

Metallic vessels or containers of various sizes and shapes designed to hold molten metals are widely used in many industrial applications. Example of these applications include, but are not limited to, gasification processes in chemical and power production, Electric-Arc Furnaces (EAF), Basic Oxygen Furnaces (BOF), ladles, blast furnaces, degassers, and Argon-Oxygen-Decarburization (AOD) furnaces in steel manufacturing. As known in the art, these containers are normally lined with refractory material installed in brick form or cast in monolithic blocks in order to protect the metallic part of the vessel from the high-temperature contents placed therein; however, due to normal wear and tear of the refractory material through the combined effects of oxidation, corrosion, and mechanical abrasion, some portion of the refractory surface in contact with the molten metal is lost during processing, thus requiring frequent inspection so as to assure extended use by performing early localized repair in order to avoid possible catastrophic failures and unnecessary or premature refurbishment of the entire vessel's refractory lining. Furthermore, as well understood by those of ordinary skill, this refractory wear process is affected by several process-related variables (including melt chemistry, mechanical abrasion, corrosion, and the amount of time the refractory is in contact with the molten material inside the vessel, to name just a few) and substantially controlled by the local temperature of the refractory materials, thus the importance of accurate measurement of this quantity.

FIG. 1 shows a conventional metallurgical container 2 having a shell 4, an internal layer of refractory material 6, and an opening 8. The dashed line 10 illustrates the original layer of refractory material before the container was placed in use. The difference between lines 10 and 6 is what existing systems are configured to detect in order for an operator to decide when to take the container out of service for repair or replacement of the lining. In addition to general wear and erosion, cracks can develop in the refractory material 6 as a result of thermal shock and repeated heating and cooling cycles in the vessel. Small cracks grow as a result of the same wear effects described above and allow molten metal to flow closer to the outer steel shell of the vessel 4, thereby creating increased probability of melting the shell 4. Melting the shell 4 is commonly referred to as "breakout" and has the potential to become a catastrophic failure mode that can cause significant damage to ancillary equipment and/or injury as some or all of the steel flows from the now-failed containment vessel. These breakouts are strongly influenced by the local temperature of the refractory surface and its variation with time when the container 2 is being used during production.

Maximizing refractory lifetime in ladles and furnaces is a critical aspect of steel mill operation. Avoiding breakouts, particularly in the ladle, has a direct correlation to safety. Minimizing refractory consumption in both the ladle and converter also contributes to operational savings associated with the purchase of the refractory itself, the labor required to install the new lining, the cost of disposing the old lining, and the production down time required for lining installation. Refractory supply companies, steel companies, and third party suppliers all work together to optimize processes, develop new and more durable refractory compounds and installation methods with the goal of minimizing refractory consumption during steel production.

Laser systems that measure the remaining refractory thickness while at operating temperature are now commonplace in all integrated and many EAF mills around the world. Laser scanners were first developed for applications in BOFs. Since every ton of steel produced in a large, integrated mill passes through the BOF, these vessel's uptime is directly proportional to annual steel production. Few, if any, major integrated steel producers now operate without some type of BOF laser scanning device in their facilities. Over the past 10 years, laser measurement of refractory wear has migrated from the BOF to the ladle. Ladle refractory consumption is the single largest line-item cost for a steel maker. Thus, the concomitant benefits of maximizing ladle refractory lifetime while providing breakout protection through wear monitoring with a laser scanner are motivating the expansion of laser-based refractory management to the ladle fleet.

Accurately measuring and monitoring refractory temperature is also an important aspect of good refractory management practice. Tapping into a cold ladle or pouring hot metal into a cold furnace causes spelling and cracking at the refractory surface; events that lead to accelerated wear and shortened lifetime. Thus, while the majority of conventional laser scanners produced have only had the ability to measure lining thickness, some have combined thickness measurement with refractory surface temperature measurement capability. These systems typically employ an interleaved detection channel, optically filtered at the scanners' laser wavelength, for the dual purpose of detecting return laser radiation (the range measurement) and black-body emission from the surface of interest. Thus, an approximate surface temperature measurement is facilitated without significant complications to the optical system of the laser range finder.

The challenge associated with the conventional interleaved approach is the single-wavelength nature of the measurement. The emissivity differences between steel, slag and refractory can be as high as 0.4 to 0.5. Since all three materials can be expected in a furnace or ladle, the temperature measurement accuracy of any single-wavelength technique applied in this environment is poor, resulting in temperature measurement errors as high as 200° C.

Despite the above-summarized progress in characterizing the wear of and the surface temperature of the refractory material 6 of the metallurgical container 2, to date no devices, processes, and/or methods exist that are capable of characterizing the wear while accurately measuring the surface temperature of the refractory surface 6. Therefore, based at least on the above-noted challenges with conventional measurement systems, it would be advantageous to have devices, methods, and systems capable of overcoming the accuracy limitations of surface interleaved temperature measurements while maintaining substantive performance of wear characterization by the integration of a multi-wavelength pyrometer with a scanning laser range finder, resulting in accurate measurements of both refractory lining thickness and refractory surface temperature.

SUMMARY

One or more of the above-summarized needs or others known in the art are addressed by apparatuses, methods, and processes for characterizing the wear and measuring the surface temperature of the lining of a container. As disclosed here, such apparatuses include a scanning device, a two-color pyrometer, and a controller. The scanning device makes spatially resolved thickness measurements of the lining of the container by measuring distances from the scanning device to a plurality of points on the surface of the lining of the container. The two-color pyrometer makes surface temperature measurements by correlating a ratio of light intensities measured at two different wavelengths to the surface temperature. The controller is configured to control operation of the scanning device and the two-color pyrometer.

Methods for characterizing the wear and measuring a temperature of a surface of a lining of a container include taking spatially resolved thickness measurements of the lining of the container with a scanning device; taking spatially resolved temperature measurements with a two-color pyrometer; and controlling operation of the scanning device and the two-color pyrometer with a controller.

BRIEF DESCRIPTION OF THE DRAWINGS

The accompanying drawings (not drawn to scale), which are incorporated in and constitute a part of the specification, illustrate one or more embodiments and, together with the description, explain these embodiments. In the drawings:

FIG. 14 illustrates tabular results of the implementation of equations that represent a general form of the TCP optical geometry for the embodiment shown in FIGS. 8-11;

DETAILED DESCRIPTION

Figure 1:
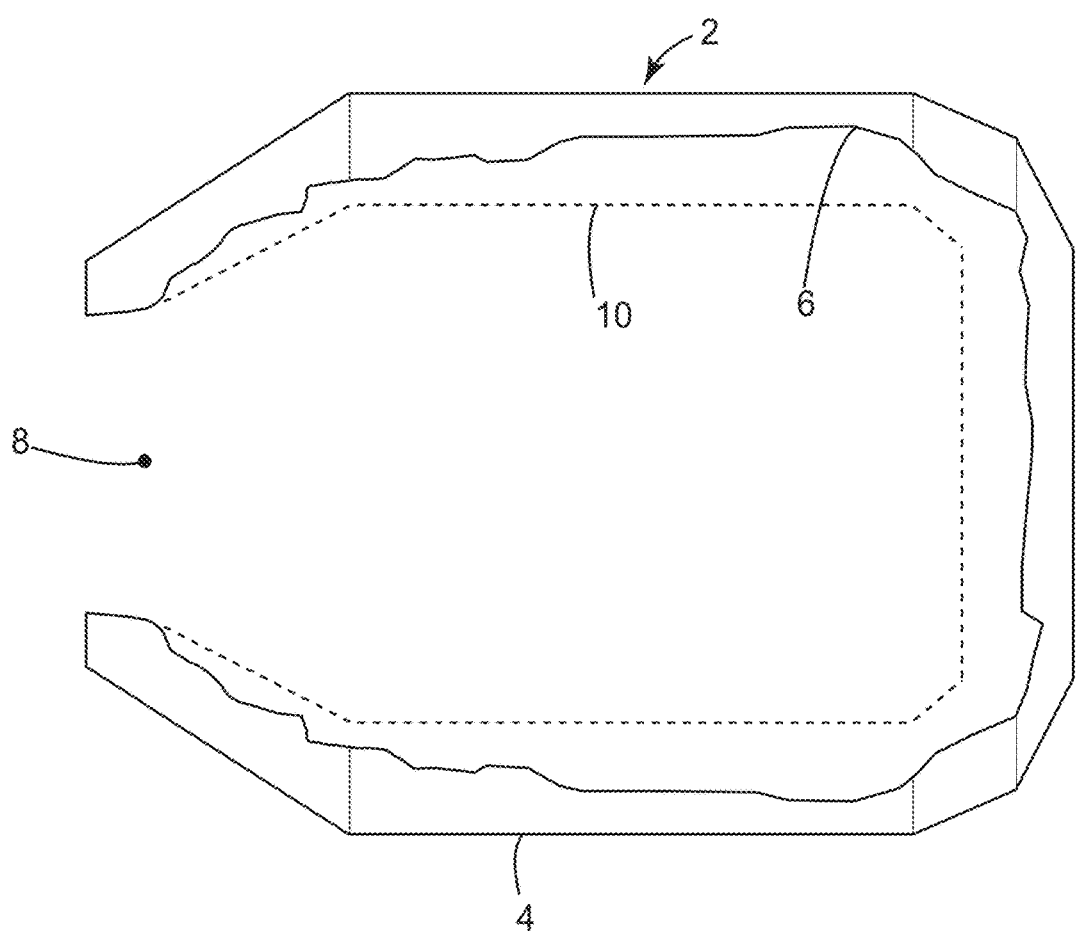
FIG. 1 illustrates a conventional metallurgical container having a refractory material protective layer.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of apparatuses, systems, or methods for, in an integrated and spatially resolved fashion, characterizing refractory material wear and accurately measuring refractory surface temperature on the refractory linings used to protect vessels or containers used in the metallurgical industry. However, the embodiments to be discussed next are not limited to these exemplary sets, but may be applied to other apparatuses, systems, or methods, including, but not limited to, the characterization of wear in refractory material, detecting, profiling, and/or measuring cracks on the lining and measuring refractory surface temperature of other containers configure to hold or transport substances having a temperature above the melting point of the materials of which the container is made.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

This disclosure describes apparatuses, systems, and processes that combine range data acquisition with surface temperature data acquisition using at least two wavelengths (or two colors) to not only characterize the local refractory material wear using the range data, but also accurately measure the refractory material surface temperature at the same locations. As it will be further discussed herein, improved performance can be obtained by implementing multi-color, or multi-wavelength, temperature measurement techniques using two separate radiation detectors that no longer use the same, interleaved detector for both range and surface temperature measurement as in conventional single-color pyrometers. Therefore, one of the advantageous features of the subject matter herein disclosed is the capability to overcome the accuracy limitations of single-color surface temperature measurements by the integration of a two-color pyrometer with a scanning laser range finder to provide accurate measurements of both refractory lining thickness and refractory surface temperature in an integrated fashion.

In the open literature sometimes two-color pyrometers are also referred to as two- or dual-wavelength pyrometers—the same being true for the types of filters (separate filters for each wavelength or sandwiched-type filters) used in these two-color pyrometers. As used herein throughout these two terms and types of filters are interchangeable and do not affect the scope of the subject matter disclosed since all types of two-color or dual-wavelength pyrometers with sandwiched or separate detectors having different combinations of spectral band pass widths are within the scope of the subject matter claimed herein.

As previously mentioned, single-color temperature measurements are subject to measurement errors associated with variable surface emissivity. These errors can be as high as 200° C. Two-color temperature measurement techniques reduce the sensitivity to emissivity to only that which changes within the two wavelength ranges incorporated in the two-color measurements. As such, in some embodiments, measurement errors can be reduced by more than a factor of 10 compared to single-color-pyrometer techniques. Single-color measurements are dependent on surface emissivity. Steel has an emissivity of 0.40-0.65 and refractory 0.8-0.95. Therefore, there can be a large variation in measured surface temperature depending on whether there is steel retained in the vessel, the condition of the refractory, etc. In short—with a single-color technique accurate temperature measurements are difficult or not possible because of the varying surface properties. Errors of 100-200° C. are not uncommon. To the knowledge of the inventors of this disclosure, no two-color pyrometer integrated with the measurement of range exists in the open literature.

Figure 2:
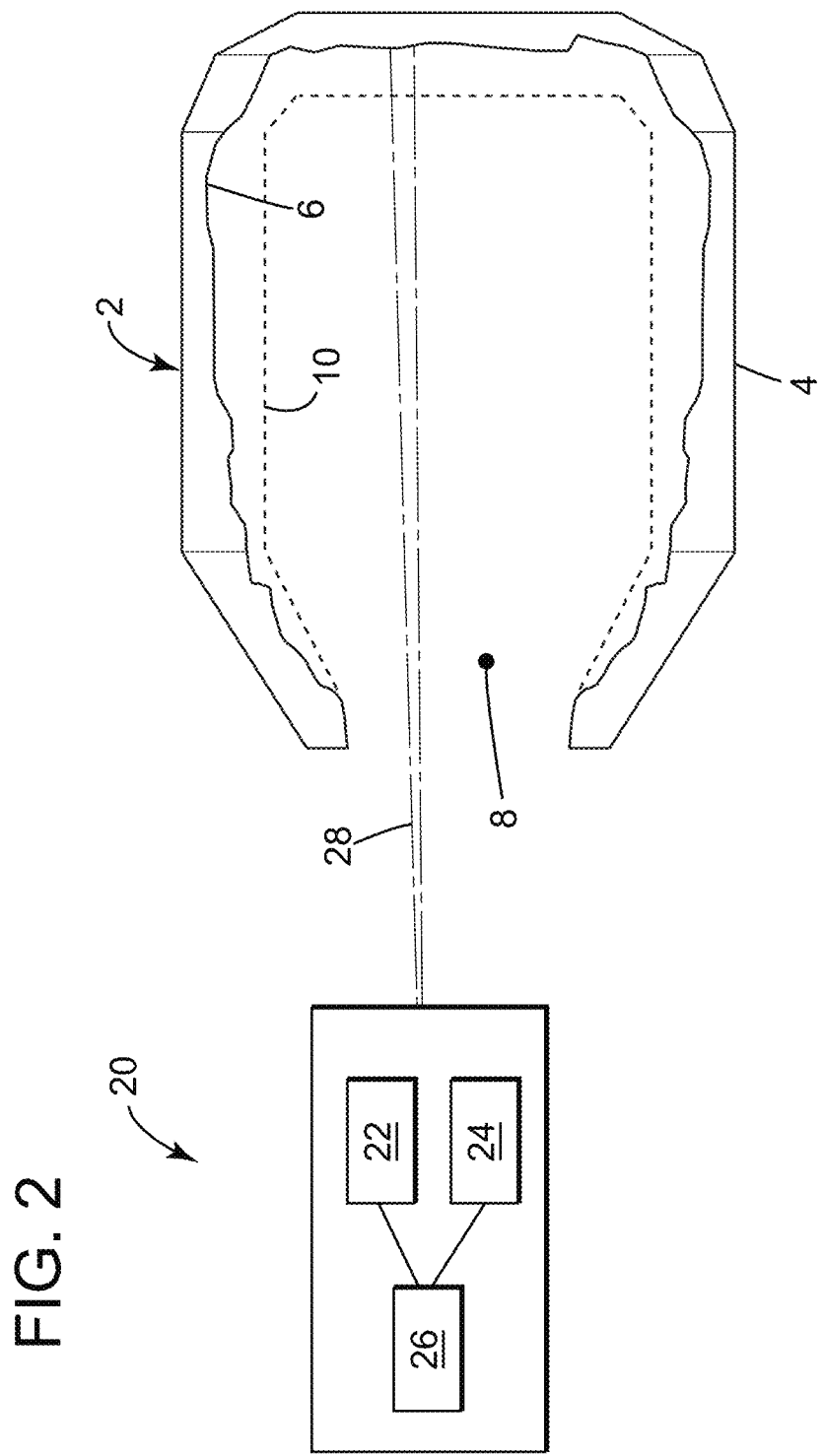
FIG. 2 illustrates an exemplary embodiment of a system according to one aspect of the subject matter disclosed.

FIG. 2 illustrates a generalized exemplary embodiment of a laser scanning system 20 for wear characterization and refractory surface temperature measurement according to one aspect of the subject matter disclosed. As illustrated, this laser scanning system 20 includes a scanner 22 for range measurements, a two-wavelength surface temperature acquisition system 24, and a general controller 26. As it will be further described below, the two-wavelength temperature acquisition system 24 is also referred to in the art as a Two-Color Pyrometer (hereinafter referred to as TCP). The scanner 22, the TCP 24, and the general controller 26 may be disposed together in the same device or be separate from one another. For example, a mobile embodiment may include all three components in the same unit, as further illustrated later. In another embodiment, the laser scanner 22 and the TCP 24 may be a unit by themselves configured to be positioned in front of the container to be characterized and the general controller 26 be positioned in another location (for example, in the plant's operation control room). As used here, the general controller 26 may also be referred to as a data reduction device 26 and/or a computing or computer device 26.

In operation, light emitted from the laser scanner 22 (represented by the field of view 28 in FIG. 2) is used to measure distance from the laser scanner 20 to the refractory surface of the container 2 in order to characterize the conditions (typically thickness and surface topology) of the refractory material 6. In addition, simultaneously or sequentially, light emitted from the container surface is collected and analyzed by the TCP 24 in order to locally measure the temperature at the surface thereof. As further explained below, the TCP 24 collects radiant emission in two wavelengths and the temperature is determined by a correlation of the ratio of the emissions in the two different wavelengths to surface temperature. As understood by those of ordinary skill in the applicable arts, it is this ratio of the emissions in two different wavelengths that permits the increased accuracy of the temperature measurements. A scanning laser range finder that includes a two-color pyrometer has been developed that has a distinct two-channel optical path that is capable of measuring surface temperature and lining thickness concurrently. In one embodiment, the range and surface temperature measurements utilize the same facet of a multi-facet scan mirror. In another embodiment, different facets are used, as further explained below.

Figure 3:
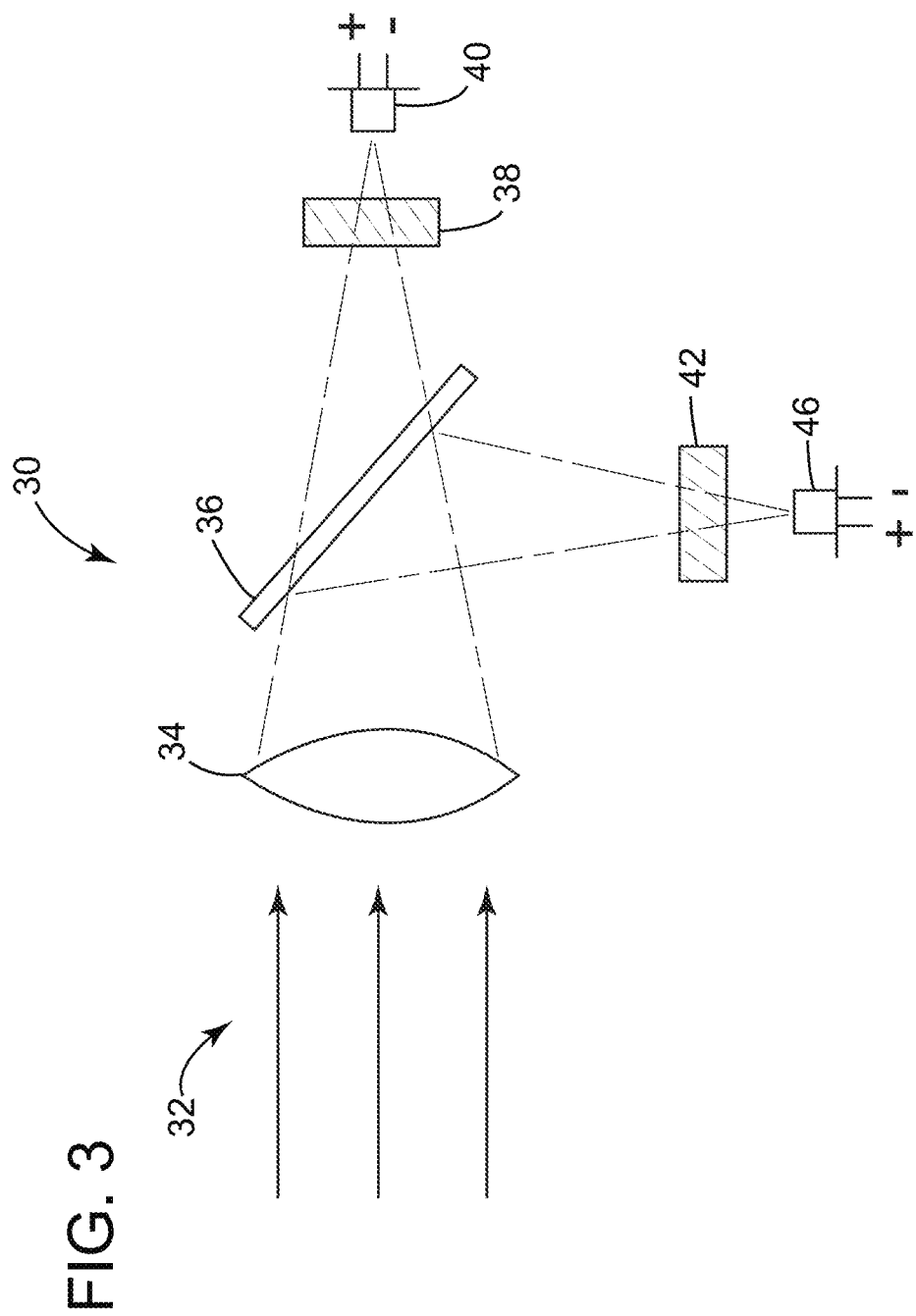
FIG. 3 illustrates a generalized optical geometry for a TCP according to one aspect of the subject matter disclosed.

FIG. 3 illustrates a generalized optical geometry for a TCP 30. As shown, incident radiation 32, originating from the surface whose temperature is being measured, is captured by a collection lens 34 and split into two paths by a beam splitter 36. In some embodiments, a dichoric beam splitter is preferable as such a device divides the signal by wavelength, thus diverting maximum energy to each downstream filter and detector. A first portion of that split beam is passed by a first spectral filter 38 designed to only allow the passage of light of a first wavelength, e.g., 940 nm and 12 nm spectral band pass width. The intensity of that light at the first wavelength is then measured by a first detector 40. The second portion of that split beam is passed by a second spectral filter 42 designed to only allow the passage of light of a second wavelength, e.g., 760 nm and 10 nm spectral band pass width and the intensity of that light at the second wavelength is then measured by a second detector 46. It should be clear to those of ordinary skill in the applicable arts, after review of the subject matter disclosed herein, that the choice of wavelengths and/or band path width for operation of the TCP does not in any way limit the scope of this disclosure. However, it is known to those of ordinary skill in the applicable arts that large spectral band path of the filter will increase the signal level at the detector while concurrently exposing the TCP to potential variations in emissivity within the band pass. Clearly, the latter is to be avoided within the constraints of achieving sufficient signal levels at detector 40 and 46.

So, as just summarized, the TCP 30 uses a ratio of energy measured at two wavelengths by the detectors 40 and 46 to create a temperature reading. This method of measurement allows the ratio of sensor output to automatically compensate for emissivity variation (for 'gray body' materials), partially filled fields of view, and dirty windows. As shown in FIG. 3, TCPs use two separate and distinct wavelength set. Because the design allows for separate wavelengths and band pass widths for each wavelength, these wavelength sets can be independently selected and combined to allow for unique capabilities. Because of the greater separation between wavelengths in some embodiments, TCPs may be as much as 10 times less sensitive to surface scale and emissivity gradients compared to single-color pyrometers. In addition, certain combination of filters can view through common industrial interferences like steam, flames, water, and plasmas. TCP's can compensate for emissivity variation, slight surface oxidation and moderate misalignment. As a result, the ability to select wavelengths gives the TCP some significant added benefits and technical advantages over single-color sensors—allowing for more accurate and reliable temperature measurement in challenging industrial application environments.

As understood by those of ordinary skill, single-wavelength pyrometers measure the amplitude of infrared energy collected over a specific wavelength span, assuming that emissivity is constant (i.e., the surface emissivity does not vary as a function of wavelength or type of material) and known over the surfaces to be measured. These sensors provide an average temperature and are affected by changes in surface emissivity, dirty optics, and other optical obstructions. Stray infrared energy from background sources may also affect the sensor reading if that energy is significant. Sensitivity to emissivity variation, optical obstructions, and background energy varies with wavelength. Therefore, wavelength selection can significantly impact the ability to view through certain intervening media, such as steam, flames, or combustion gasses.

Ratio pyrometers, or TCPs, measure the ratio of energy collected at two selected wavelengths assuming that the ratio of emissivity at the two wavelengths is reasonably constant and known (the definition of a gray body material). The ratio value is not affected by so called "grey" obstructions (those that obstruct both wavelengths equally). As such, these sensors are able to correct for emissivity variations, and to view through smoke, dust, and most other optical obstructions. Sensitivity to variations in the ratio of emissivity at the selected wavelengths varies slightly by wavelength pair and it is often preferred to select wavelengths between 500 and 1000 nm for metal measurement (either molten or solid). Gray material (slag and refractory) tend towards more gray emission, and measurement in the infrared spectrum above 1000 nm is possible. The latter gives the advantage of higher light intensities and improved signal to noise ratio in the TCP. In some embodiments, regardless of wavelength, the smallest bandpass widths that yield acceptable signal level may be selected. These are typically in the range of 10-15 nm. Similarly, the sensitivity to some types of intervening media, such as water, steam or combustion byproducts, may vary with wavelength selection. The TCP reduces measurement error associated with surface emissivity variation. However, surface emissivity variation within the wavelength pass band of the TCP detectors may still contribute to measurement error. Moreover, any optical temperature measurement technique may be subject to gas-phase absorption that may or may not be present in one or both pass bands of the detectors.

Continuing with the operation of the laser scanning system 20 in FIG. 2, for wear measurements, through the field of view 28 shown in that figure, the scanner 22 scans the refractory material 6 in the container 2, generating a cloud of data points to be transferred to the general controller 26. Desirable characteristics of the laser scanning system 20 include time precision in order to provide desired levels of range accuracy, angular measurement accuracy and precision of the laser beam pointing devices, and laser beam diameters that will provide the desired overall accuracy and precision as noted above. According to an embodiment, scanning data from the scanning system 20 are processed as now discussed. Note that in the field of characterizing the wear of metallurgical containers, there are existing processes for collecting rage data and applying various known processing steps in order to generate an image of the lining surface so as to identify areas in need of repair. Based on this image, which can be represented in print, on a screen, in a tabular way, etc., a metallurgical container expert determines whether repair to the lining of the container is needed and advises a metallurgical company accordingly. Examples of range scanners include those described in U.S. Pat. Nos. 8,958,058, 9,279,773, and U.S. Pat. No. 9,435,889 (the contents of which are incorporated herein by reference in their entirety).

The scanner 22 is a remote sensing technology that measures distance by illuminating a target with a laser and measuring the transit time for the photons emitted by the laser source to traverse the round-trip distance between the source and the far field reflective surface. A typical 3-D laser scanner 22 includes a laser, a scanner, optics, a photodetector, and receiver electronics. Those of ordinary skill in the applicable arts will appreciate, after reviewing the subject matter herein disclosed, that various different types of lasers might be used in the scanner 22, including lasers having different wavelengths as well as different modes of operation (e.g., pulsed or continuous types). As it will be further discussed below, accuracy and resolution of the characterization and measurement of the refractory wear of the container 2 will depend on how the laser in the scanner 22 is focused by the optics, which will also define the field of view of the scanner 22. Better resolution can be achieved with shorter pulses provided the receiver detector and electronics have sufficient bandwidth to cope with the reduced pulse width. The speed at which images can be developed is affected by the speed at which it can be scanned into the system. A variety of scanning methods are available to scan the beam through the required azimuth and elevation angles. These include dual oscillating plane mirrors, dual axis scanner, and polygonal mirrors. Accurate mirror positioning affects measurement accuracy. Scanning using polygonal mirrors lends itself to measurement with high resolution encoders and is frequently used in scanning laser range finders.

In addition, the general controller 26 of the laser scanning system 20 may include a data reduction device to handle wear characterization and surface temperature measurement. This data reduction device may be incorporated inside of or connected to the laser scanning system 20. A typical scanner laser range finder incorporates an assembly consisting of a pulsed laser, a method to detect the laser emission event, a multi-faceted mirror, a high-speed detector to detect the light reflected from the far-field surface, and a motor or driver for slowly rotating the aforementioned assembly across the scene of interest. In practice, the laser and detectors work in combination to measure distance, and the mirror/motor direct the laser to create a raster image across the scene. High-resolution encoders are commonly used to determine the angular position of both a fast-scan (elevation) and a slow-scan (azimuth) rotation.

In one preferred embodiment, a Light Detection And Ranging (LIDAR or LiDAR) laser scanner is used in the scanner 22. In another embodiment the laser scanning system 20 comprises an Anteris laser scanner, having a small (about 3.6 mm) beam diameter, high accuracy (±6 mm peak-to-peak range error) scanning, large scanning rates (up to about 500,000 Hz), a robust design suitable for the mill environment and the heat loads imposed during scanning high temperature surfaces, an eye safe laser wavelength (which eliminates and/or substantially reduces workplace safety concerns), +65°, −45° vertical scan angle range, and 0-360° horizontal scan angle range. Such a laser scanner allows standard resolution scans of a vessel interior in about 6 to 10 seconds, resulting in less vessel down time and higher production availability. In high-resolution mode, the Anteris scanner can provide detailed images of the vessel that can be used to detect cracks, define the region around a tap hole, or the condition of a purge plug. Sensors on the instrument measure the amount of time it takes for each laser pulse to leave, travel to the far-field surface and, after reflection, return from the target surface to the scanner. Light moves at a constant and known speed so the scanner 22 can calculate the distance between itself and the target with high accuracy. By repeating this in quick succession the instrument builds up a range 'map' of the surface it is measuring. By calculating and/or comparing changes between measured range maps of the refractory material 6 with reference measurement of the same surfaces, changes in refractory thickness or surface topology are detected that may result in failure of the container 2. As it has been already explained, one of the advantageous features of the subject matter disclosed is that incorporation of the TCP with the scanner just describe allows one to make range and surface temperature scans of surfaces of interest substantially simultaneously.

As those of ordinary skill in the art will appreciate, except to those possibly noted and identified herein throughout, none of the features in the laser scanning system 20, the TCP 24, and the general controller 26 are to be considered limitations to the subject matter disclosed.

The two-color temperature measurement function should be implemented so as to minimize any deleterious impact on the range measurement, and vice versa. Thus, although an optical geometry that completely segregates the TCP from the range measurement (herein referred to as non-collinear embodiments) might be favored, an optical geometry that embodies collinear light collection can simplify the overall optical configuration of the TCP/range finder combination. In collinear embodiments, a portion of the radiant emission collected by the scanner's optical system is sampled by an appropriately configured and positioned beam sampling window. The sampled energy is directed towards the input lens of the TCP. This approach has the advantage of ensuring that the collection optics of both the range finder and TCP "look" at the same far-field point in space.

Figure 4:
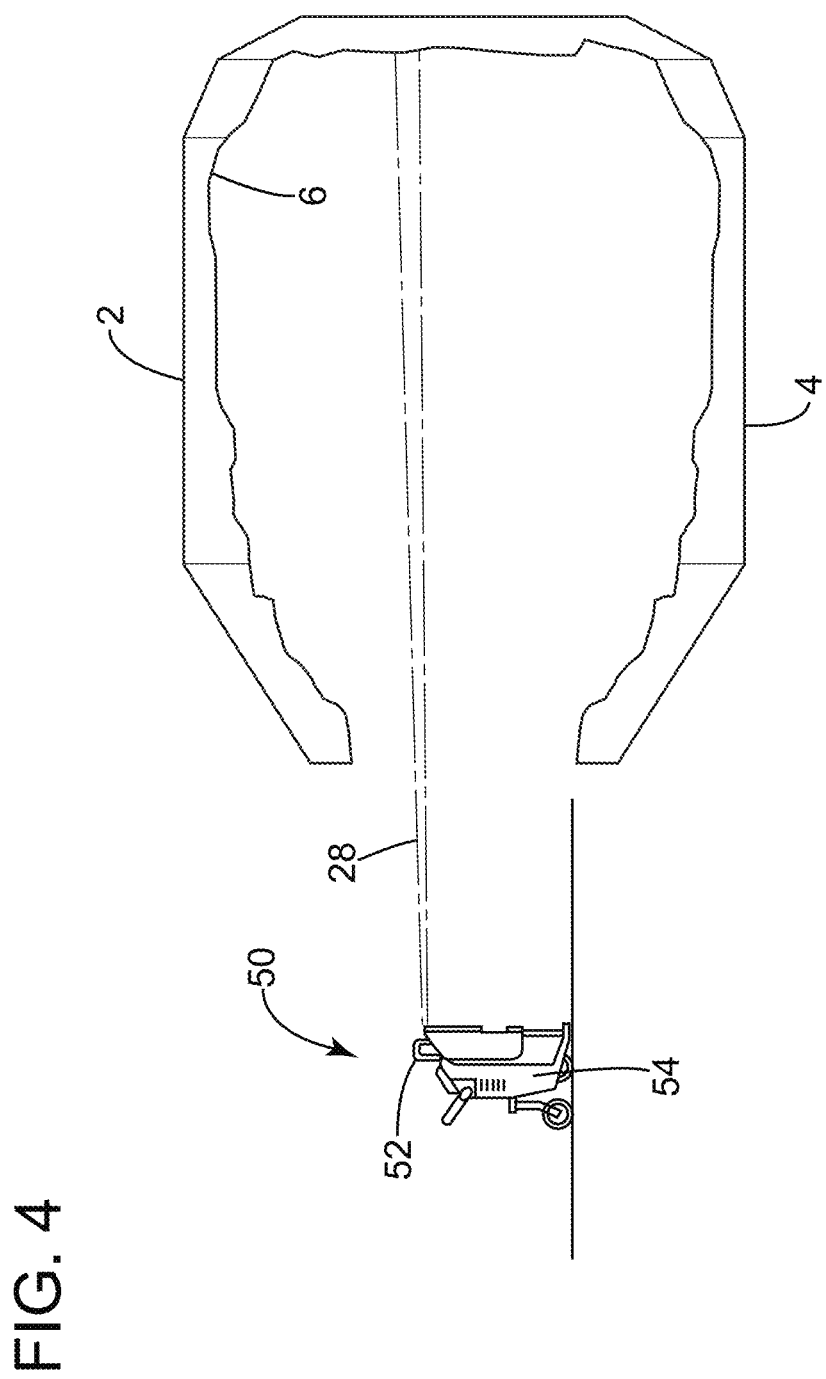
FIG. 4 illustrates an exemplary embodiment of a mobile range and surface temperature scanning system according to one aspect of the subject matter disclosed.
Figure 5:
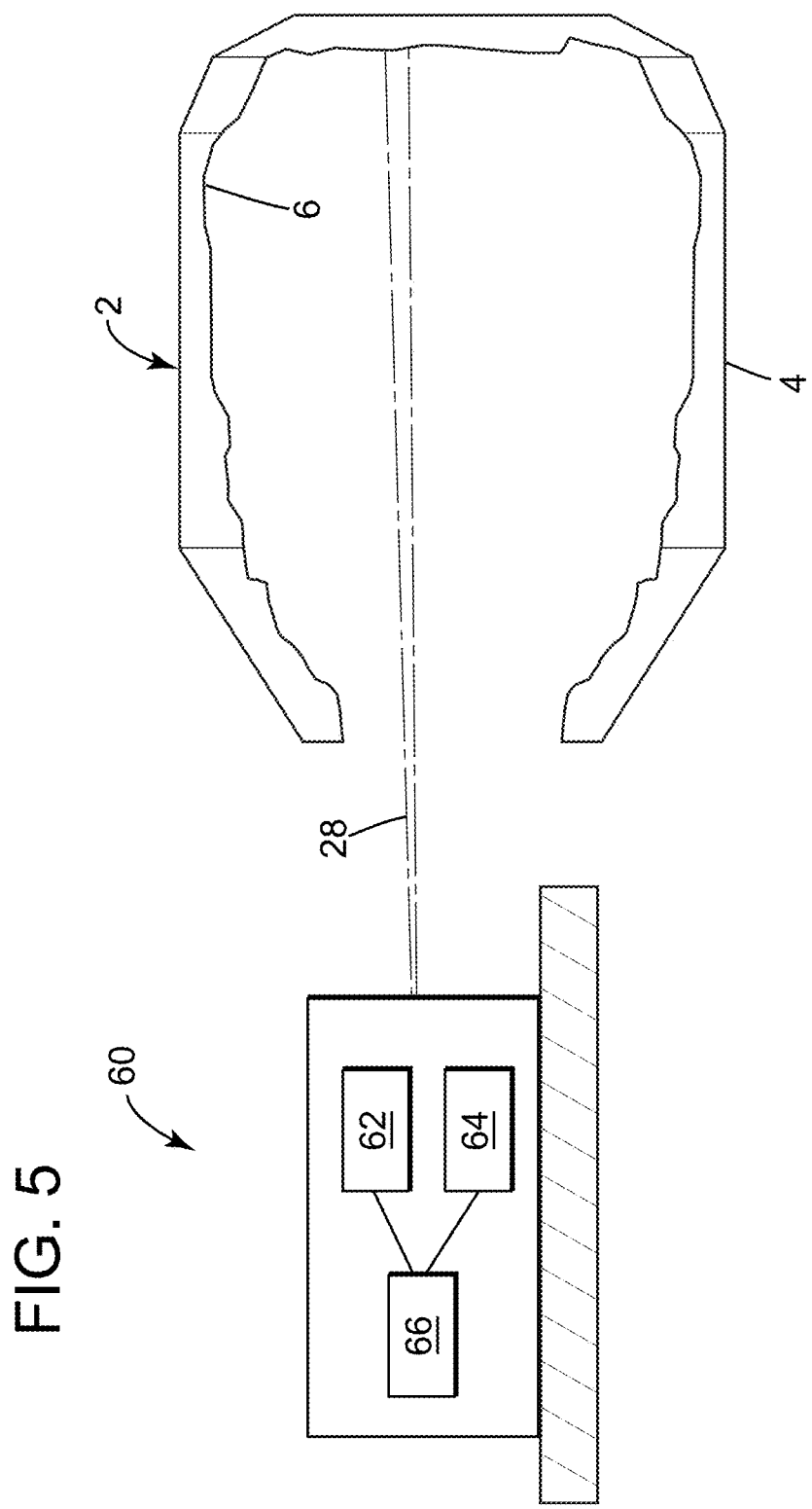
FIG. 5 illustrates an exemplary embodiment of a stationary range and surface temperature scanning system according to one aspect of the subject matter disclosed.

FIGS. 4 and 5 illustrate different embodiments of the subject matter disclosed herein. In FIG. 4, a laser scanning system 50, comprising a scanner for range measurements and a TCP for refractory surface temperature measurements (both not illustrated) are incorporated in a mobile system 54. Light is emitted and collected via optics 52 and processed as already explained previously. An advantageous feature of the laser scanning system 50 is that it can be moved around the plant in order to characterize various containers in different locations in a production line. In FIG. 5, a stationary laser scanning system 60 is illustrated, which includes a scanner 62, a TCP 64, and a general controller 66. In use, various containers 2 can be placed in front of this stationary system for wear characterization and surface temperature measurement. One of the advantageous features of such a stationary system is that the general controller 66 may be placed in a control room in the plant and characterization of wear and surface temperature measurements can be carried and/or controlled remotely.

Figure 6:
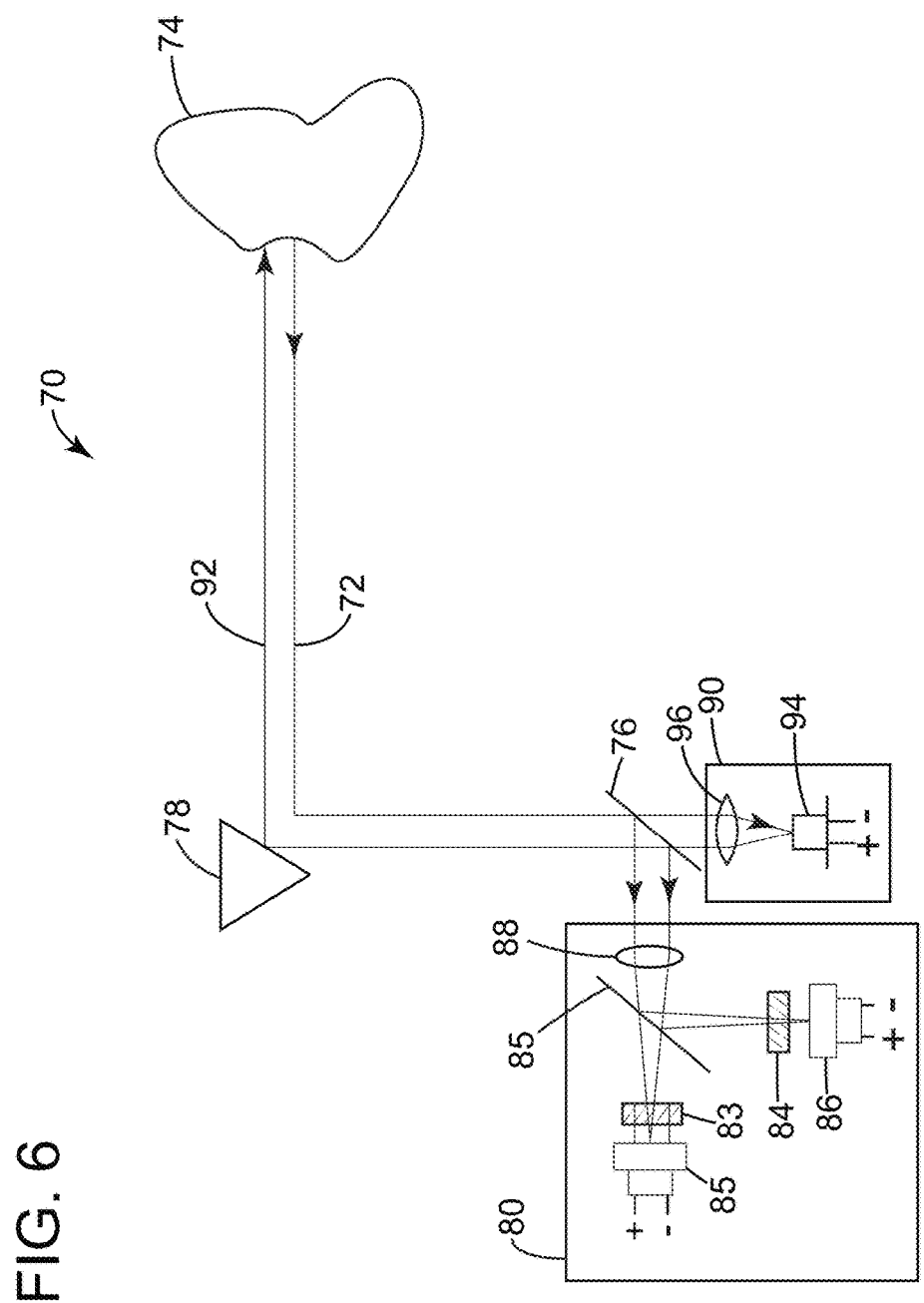
FIG. 6 illustrates a generic schematic of an optical arrangement of a collinear range and surface temperature scanning system according to one aspect of the subject matter disclosed.

Those of ordinary skill in the applicable arts will understand, after reviewing the subject matter disclosed herein, that two optical arrangements are possible for laser scanning systems embodying the wear characterization and surface temperature measurements herein disclosed. In the first optical arrangement, illustrated in FIG. 6, in a laser scanning system 70, a TCP 80 and a range scanner 90 are collinear to each other, i.e., the radiation 72 returning from a target 74 is split by a first beam splitter 76 and shared by both the TCP 80 and the range scanner 90 for the respective measurements of surface temperature measurement and refractory wear. Scanning of the entire surface of the target 74 is accomplished by incorporating a motor to rotate a multi-faceted mirror 78 in one direction so as to allow scanning the entire surface of the target 74. In use, the pulsating laser of the scanner 90 emits a radiation beam 92, that is reflected from the far-field surface, passing through a lens 96, to a scanner detector 94. Part of the returning radiation 72 also comprises light emitted by the surface of the target 74. In the TCP 80, a portion of that returning radiation is focused by a lens 88 and subsequently split by a second beam splitter 85 and the radiation intensity in two specific wavelength ranges are filtered by first and second filters (83 and 84) and measured by corresponding detectors 85 and 86. One of the advantageous features of this embodiment is that miniaturization of the apparatus is possible, thus allowing the system 70 to be more versatile. However, given the splitting of the incoming radiation 72, the gains of the detectors 85, 86, and 94 may need to be increased due to a possible reduction in intensity of the respective radiation being measure thereby. As shown, in this embodiment, the same facet of the multi-faceted mirror 78 is used, thus allowing wear characterization and surface temperature to be measured at the same location and at the same time and without further mathematical or geometric calculations.

Figure 7:
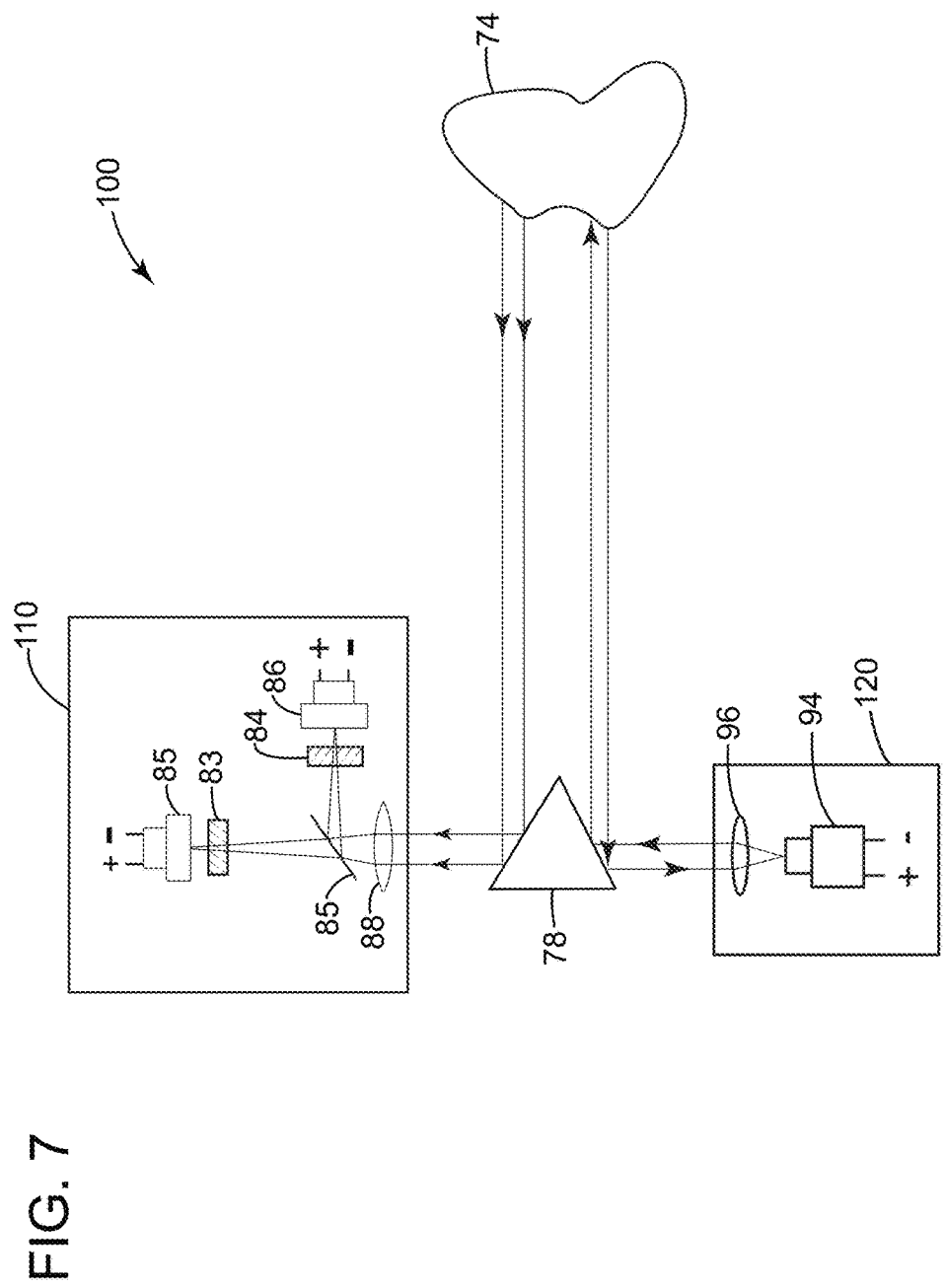
FIG. 7 illustrates a generic schematic of an optical arrangement of a non-collinear range and surface temperature scanning system using different facets of a rotating mirror according to one aspect of the subject matter disclosed.

In the embodiment shown in FIG. 7, in another laser scanning system 100, a TCP 110 and a scanner 120 are non-collinear to each other and each operates on different radiation emissions from the target 74 and uses separate facets of the multi-faceted mirror 78. Such an arrangement increases the available radiation for each system, thus minimizing possible issues related to available radiation for each of the three detectors. However, although each measurement by the TCP 110 and the scanner 120 are most likely not being made at the same time, additional data treatment is needed to ensure that in the final data set reported to the user, the TCP and range data are spatially correlated, e.g. they pertain to substantially the same physical location on the far-field surface 74.

An apparatus has been built and tested according to the non-collinear optical geometry shown in FIG. 7. Details of that device will now be described and experimental test results will later be shown. It should be understood that this exemplary embodiment does not limit the subject matter disclosed and is discussed here simply as an illustration of one of its embodiment.

A standard TDS-300 laser scanner has been outfitted with an additional collection lens to collect light for the TCP. Scene scanning was effected using the same optics as that of the range finder, and the TCP was positioned so as to allow both operation of the scanning range finder and collection of radiant surface emission substantially simultaneously. The radiant flux collected by the TCP lens was directed to a dichroic beam splitter that separated photons by wavelength: long wavelength photons were directed to the first detector and short wavelength photons to the second. The detectors converted the photon flux to a voltage level that was read by the scanner electronics. The ratio of the two signal levels was related to the surface temperature using conventional two-color pyrometer equations.

Figure 8:
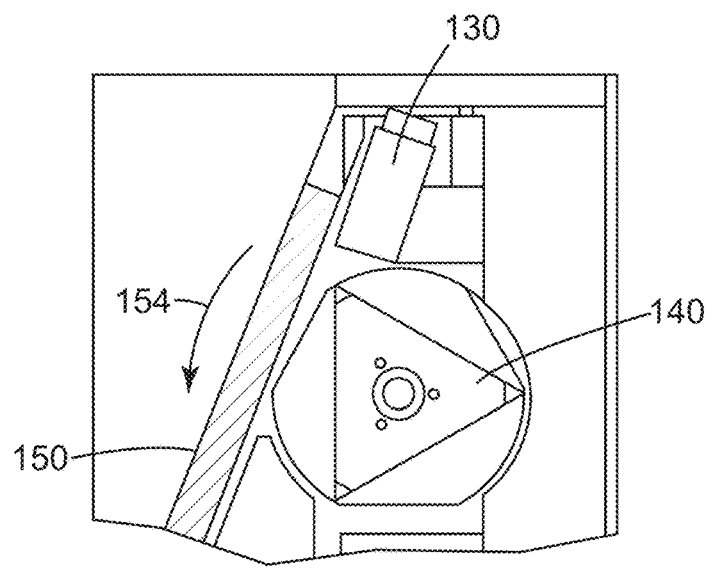
FIG. 8 illustrates a schematic of a TCP and a multi-faceted mirror arrangement according to an embodiment of the subject matter disclosed.
Figure 9:
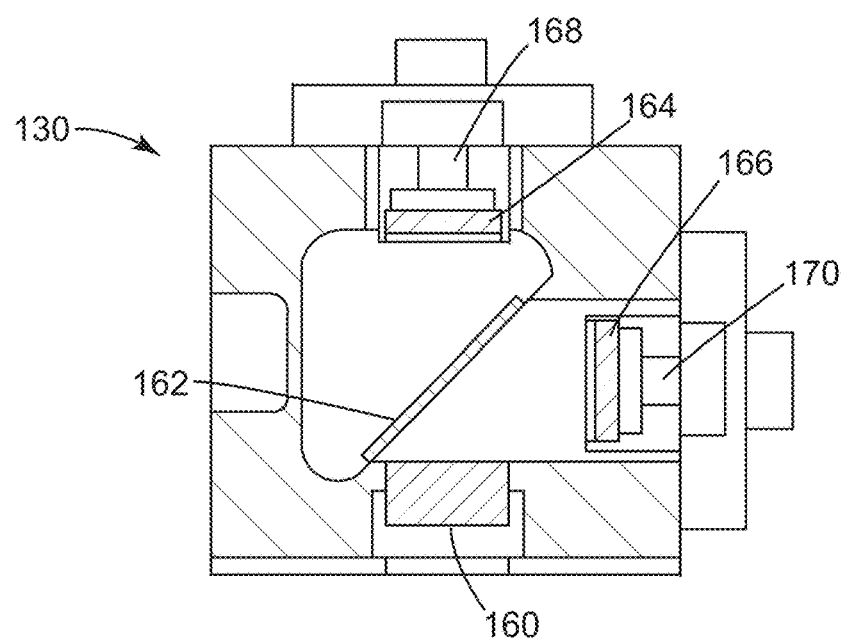
FIG. 9 illustrates a sectional view of the TCP of FIG. 8.
Figure 10:
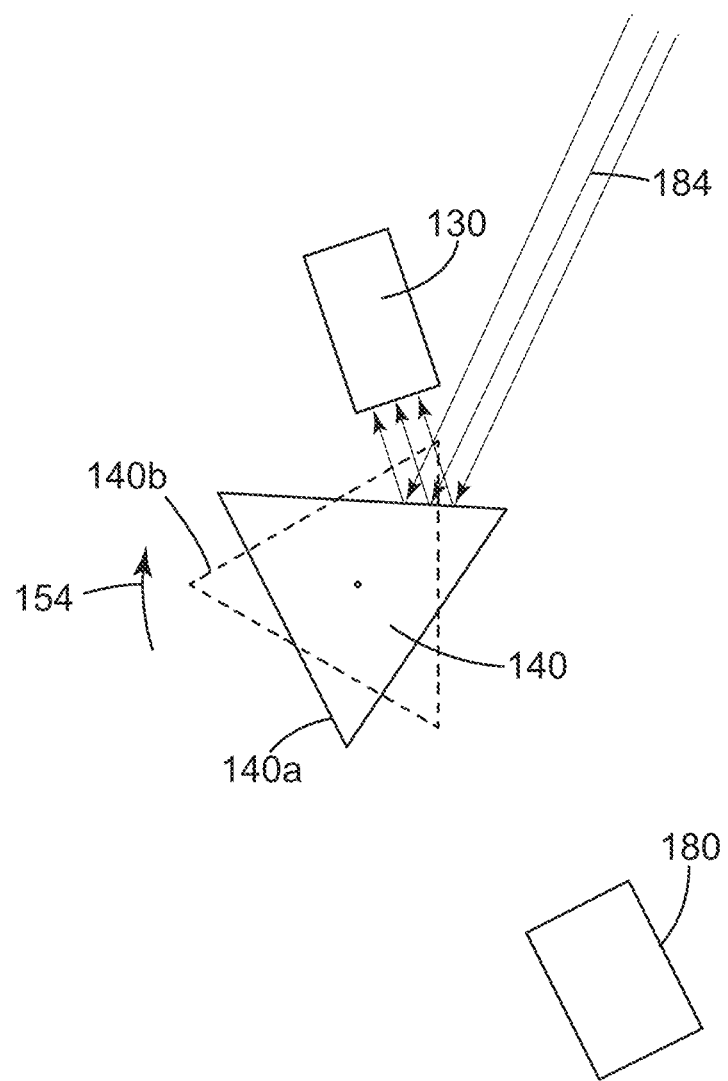
FIG. 10 illustrates a generic schematic of an optical arrangement of a non-collinear range and surface temperature scanning system with a rotating multi-faceted mirror in a position to start temperature data acquisition according to one aspect of the subject matter disclosed.
Figure 11:
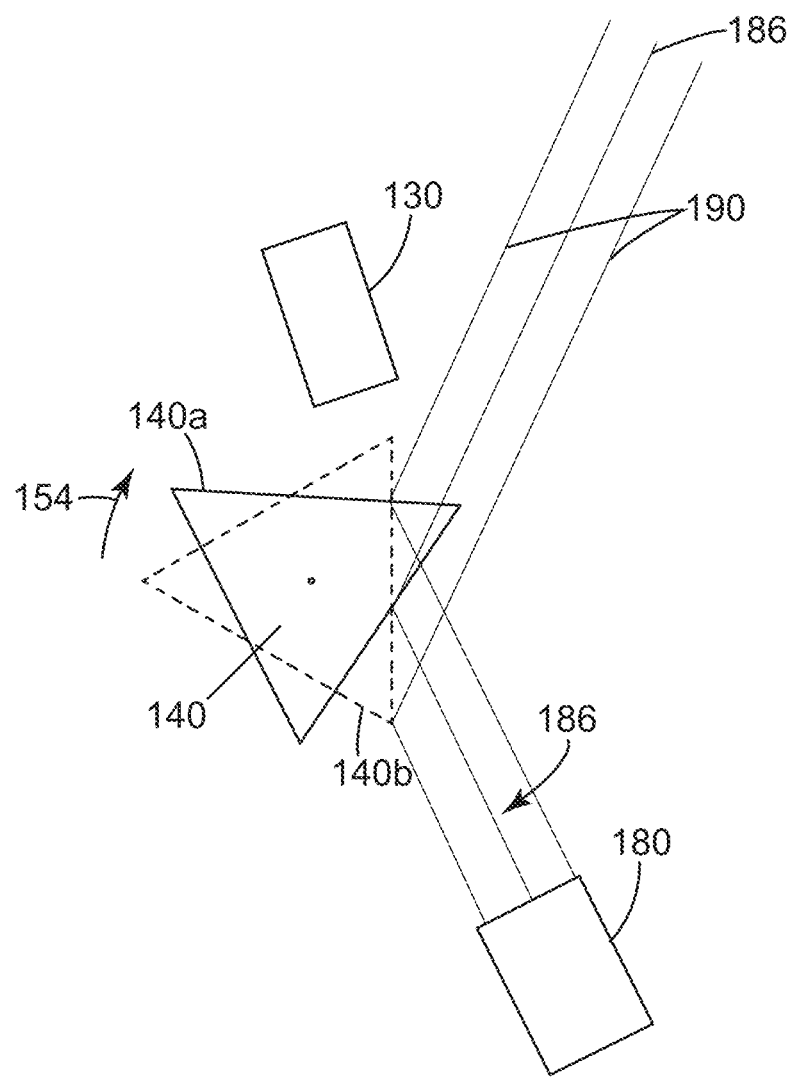
FIG. 11 illustrates the device of FIG. 10 with the rotating multi-faceted mirror in position to start range data acquisition.

FIGS. 8-11 illustrate optical details of the test apparatus, which included an optical geometry in which the TCP is non-collinear with the range measurement. In such an embodiment, the TCP 130 (shown in FIG. 8) is completely separate from the range measurement (as shown in FIGS. 10 and 11) and disposed above the multi-faceted mirror 140. So, light coming from the target passes through the window 150, reflects from one of the facets of the mirror 140 and reaches the TCP 130. The direction of rotation of the multi-faceted mirror 140 is represented in FIG. 8 by arrow 154.

Further detail of the TCP 130 optical arrangement is shown in the cross-sectional view of FIG. 9. The TCP 130 includes collection lens 160, a beam splitter 162, spectral filters 164 and 166 and their respective detectors 168 and 170. Emitted light reflected from one of the facets of the mirror 140 enters the TCP 130 through the TCP collection lens 160, is split by the dichroic beam splitter 162 and different spectral portions of the emitted radiation is directed through the spectral filters 164 and 166, finally reaching the detectors 168 and 170. As explained in connection with FIG. 7, in some embodiments, different mirror facets are used to direct the laser range finder and TCP optical image to substantially the same point in space. While this approach allows for distinct TCP and range finder optical channels, the TCP and laser range finder measurements are not made at the same time nor do they use the same mirror facet for light collection. Therefore, the TCP and laser range finder measurements need to be mathematically coordinated in a post-measurement process to ensure that the range and TCP measurements are spatially correlated in the reduced data.

Integration of the TCP 130 with a range finder 180 of the test apparatus is illustrated in FIGS. 10 and 11, which also shows light paths for the TCP 130 (FIG. 10) and range finder 180 (FIG. 11) measurements. Direction of rotation of the multi-faceted mirror 140 is shown in FIGS. 10 and 11 by the arrow 154. As shown in these figures, the TCP 130 is disposed above the multi-faceted mirror 140 and the range scanner 180 below. As already explained, light emission 184 from the target is collected by the TCP 130 after reflection on one of the facets of the mirror 140 in a first position 140a and processed as previously explained.

For the range measurements, a laser (not shown in FIG. 11) in the scanner 180 emits a light beam 186, which is reflected from a facet of the rotating mirror 140 at position 140b, thereafter traveling to the target. Reflections 190 of the light beam 186 returns to a detector (not shown) of the scanner 180 via the same path, that is, first passing through a facet of the mirror 140 at position 140b and before being processed for the measurement of the distance from the device to the target. Conventional scanning is then used to rotate the entire device in a first direction, which combined with the rotation of the mirror 140, allows the device to create a 2D map of range and temperature data.

Those of ordinary skill in the applicable arts will appreciate, after considering the contents of the subject matter herein disclosed, that regardless of how the optics are integrated, the spatial resolution of the TCP should preferably be on the same order of magnitude as that of the range measurement. At the surface of interest for the test apparatus, range measurements were typically separated by 6-25 mm, and the test TCP was constructed to approximately match this spatial resolution. This can be accomplished by incorporating a spatial filter in the collection geometry of the TCP. The spatial filter element can either be an optical pin hole, or effected through the use of a small (100 micrometer) diameter detector.

In order to enhance signal strength, a dichroic mirror can be used in place of a beam splitter, as it was used in the test apparatus. The pass band of the spectral filters can either be large or small. Wide pass bands have the advantage of increasing signal levels and minimizing sensitivity to variations in emissivity within the pass band at the expense of degrading temperature measurement accuracy. Narrow pass bands generally improve temperature measurement accuracy but reduce signal level and leave the system more susceptible to emissivity variation within the passband. Thus, a compromise is made between these parameters. Band pass width of 10-20 nm are typical.

The collected signals were fed continuously into an 8-deep averaging FIFO that continuously calculates the per-channel signal average of the last 8 signals. Hence the effective collection rate of the system was approximately 500 kHz or 2 µs per sample, which was congruent with the peak sampling rate for range data, thus matching the collection speed of temperature data with range data.

The pyrometer channels were optically different from the range channel. This necessitated synchronization of the collection of pyrometer data with the range data. Synchronization of pyrometer and range data was accomplished by a Field Programmable Gate Array (or FPGA). The FPGA generated timing signals (square waves) that gated on pyrometer and range data acquisition. The timing was driven by the encoder attached to the spinning mirror in the system. The timing signals could be independently adjusted allowing for fine tuning of the acquisition timing. Given the optical geometry shown in FIGS. 8-11, the timing of the signals was generated such that the first packet of pyrometer data acquired was spatially coherent with the first packet of range data acquired. This allowed assembly of a coherent data packet where all of the information within (range, pyrometer color readings, and encoder readings) were synchronized. Physically, this ensured that the source of the data in any individual data packet was from substantially the same physical location on a target. The net result was essentially the equivalent of a digital picture or raster scan. However, each pixel in the image contained reflected laser intensity, range to target, and pyrometer color data. In the embodiment shown, the pyrometer color data were analyzed post-acquisition to determine surface temperature at any given point in the raster scan.

Figure 12:
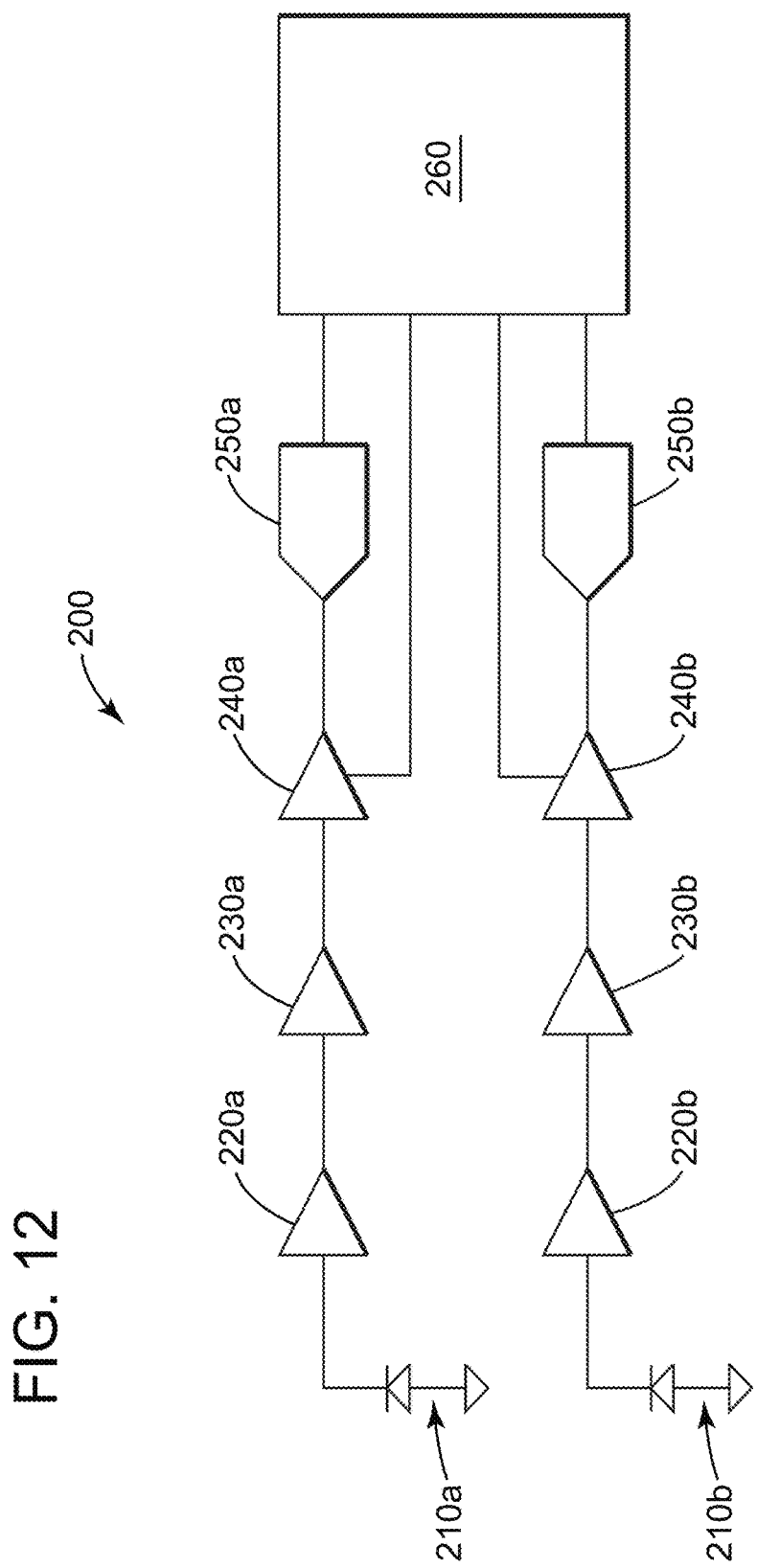
FIG. 12 illustrates a schematic of electronic data-acquisition components according to an embodiment of the subject matter disclosed.

A diagram illustrating the signal processing for the test apparatus is shown in FIG. 12, illustrating how the two wavelength signals were processed electronically for the TCP measurements. As shown, the electronic system 200 comprised two independent signal channels for the two different wavelengths. Initially, filtered wavelength light entered each photodiode 210a and 210b, producing photo-current outputs. Photocurrents were then converted to voltage at the trans-impedance amplifiers 220a and 220b. Voltage outputs from the trans-impedance stage were subsequently amplified by fixed gain amplifiers 230a and 230b. Voltage output from the fixed gain amplifiers were further amplified by programmable gain amplifiers (or PGA) 240a and 240b, whose gains were set at the FPGA 260 controlled by FPGA-based processor software. Voltage outputs from the PGAs were converted by high-speed continuous sampling 12-bit analog-to-digital converters (ADC) 250a and 250b to serial digital data. Finally, serial digital data were received by the FPGA 260 and digitally processed. Optimal results were obtained, but not limited to the incorporation of silicon or indium gallium arsenide detectors selected to operate within the two wavelength signals. In the test apparatus of FIGS. 8-11, the detector area was small and limited in aperture using a suitably sized pinhole. The small detector area also allowed fast response times well above the bandwidth needed to acquire the pyrometry signal. Transimpedance amplifier gain and bandwidth may be set from a first-order low-pass filter, optimizing output signal while reducing unwanted high-frequency current and voltage noise. Detector bias voltage may be applied to small area detectors to decrease their capacitance thereby reducing input voltage and current noise of a transimpedance amplifier. Finally, additional signal amplification, buffering, zero referencing, and noise reducing multiple order low pass filtering can be applied as appropriate ahead of the programmable gain amplifiers and analog to digital converters.

Figure 13:
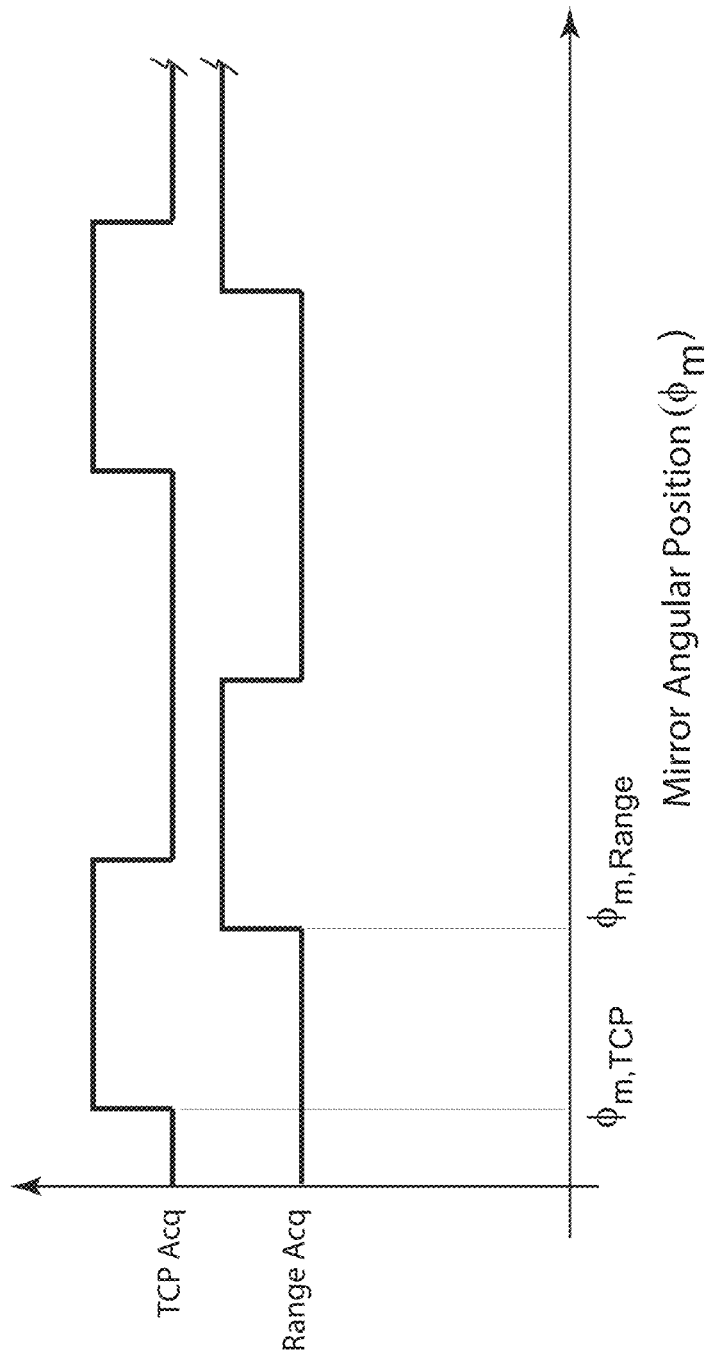
FIG. 13 illustrates time traces of temperature and range data acquisition related to the embodiment shown in FIGS. 8-11.

In order to assure that both instruments would acquire their respective data from substantially the same location each time the target was scanned, a model of the light transmission through the multi-faceted mirror was implemented in order to solve when the same target area was being scanned for the range scanner and the TCP. Once that region was determined by a solution of this model, the data acquisition system shown in FIG. 13 assured that acquisition of both data would take place at different times (as a function of the mirror rotation, which was known), but that both light transmissions were illuminating substantially the same spot on the target each time. As such, taking these two measuring systems, data were collected for both, packaged, and sent, making sure that the information about color and range were coincident, that is data were from the substantially the same point in space. Therefore, knowing the geometrical features of the mirror used in the test apparatus (or any other embodiment, for that matter), including the fact that in this application the mirror has the cross-sectional shape of an equilateral triangle, the above can be modelled as now explained.

If F is a line representing one facet of the multi-faceted mirror, with points $P_{f1}$, $P_{f2}$, and $P_{fm}$ defining the end points and middle point thereof, defining a basic coordinate system in two dimensions at the centroid of the equilateral triangle to define F, which is the equation of a line that represents one of the facets at a given mirror angular position, $\varnothing_m$, one obtains the following parametric equation for F:

$$F = (1-t)P_{f1} + tP_{f2}. \tag{1}$$

If one represents the middle point $P_{fm}$ in terms of the x and y coordinates and the angular position of the mirror, $\varnothing_m$, one gets:

$$P_{fm} = R_{tm}(\cos \varnothing_m x - \sin \varnothing_m y), \tag{2}$$

where, $R_{tm}$ is the distance from the centroid to the line F. Substituting Equation (2) into Equation (1) and rearranging terms, knowing the angular features of an equilateral triangle, one gets the following expressions for the x and y components of F, i.e.:

$$F_x = 2R_{tm}[(1-t)\sin(150+\varnothing_m) + t\sin(30+\varnothing_m)]x + P_{mx} \tag{3}$$

and $$F_y = 2R_{tm}[(1-t)\cos(150+\varnothing_m) + t\cos(30+\varnothing_m)]y. \tag{4}$$

Turning now the attention to the range measurement, the laser is emitted from some place in space, reflects from the surface of the mirror, and travels to the target location, defining a laser launch line that is reflected from the mirror on the way to the target. That geometry has also to be described. Equations take a similar form to those shown in Equations (4) and (5). Considering a laser beam starting at $P_0$ and finishing at $P_L$, when the laser pulses, vector L starts at $P_0$ and ends at $P_L$ which is a function of the range R to a given target. The expression for L then similarly becomes:

$$\vec{L} = (1-r)P_0 + lP_L. \tag{5}$$

However, L may also be described in cylindrical coordinates as a function of the angle $\gamma_L$ between the vector L and the x axis at $P_0$, yielding, after decomposition into x and y components, the following expressions:

$$\vec{L}_x = P_{Lx} + (1-l)\cos(\gamma_L) \tag{6}$$

and $$\vec{L}_y = P_{Ly} + (1-l)\sin(\gamma_L) \tag{7}$$

Now, solving for the beam and mirror facet intersection at point $P_I$, that is, finding the intersection of vectors F and L, one obtains:

$$P_{Ix} = P_{Lx} + (K_1 t_f + K_2)\cos(\gamma_L), \tag{8}$$

and $$P_{Iy} = P_{Ly} + (K_1 t_f + K_2)\sin(\gamma_L). \tag{9}$$

Now that the intersection point at the mirror face is known, using the reflection geometry, one may find the target location at $P_T$. That is, in terms of $P_0$, the intersection point $P_I$, and the target location $P_T$, $P_T$ is given by:

$$P_T = P_0 + (P_I - P_0) + (P_T - P_I). \tag{10}$$

Those of ordinary skill will appreciate that Equation (10) is a function of the position of the mirror, $\varnothing_m$, and can be solved for the value of $\varnothing_m$ for when $T_m$ intersects $P_T$, yielding the following equation that is to be solved iteratively:

$$\frac{-P_{Iy}}{f_{target\ distance} - P_{Ix}} = \tan(180 - 2\varnothing_m - \gamma_L) \tag{11}$$

Figure 14:
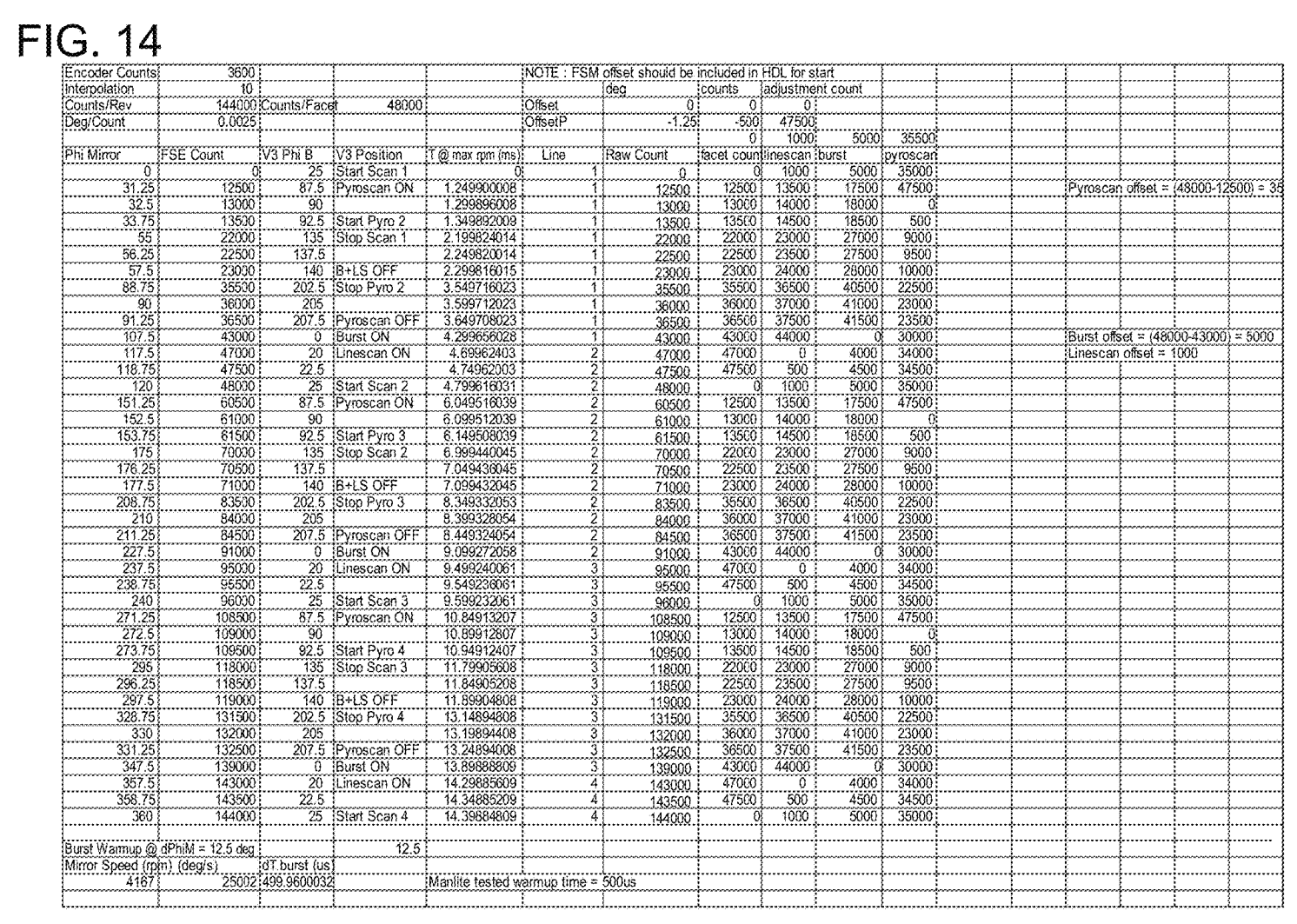

A spreadsheet, shown in FIG. 14, was constructed to implement all of the previously described geometric equations that represent a general form of the pyrometer optical geometry. Columns of the spreadsheet represent the dependent variables, e.g. K1, K2, PL, PT, etc. while the rows represent the independent variable, øm. To verify the equations two steps were taken. First the values were calculated for a "simple" geometry, with $\gamma L = 90$. This reduces the problem to largely orthogonal and illustrates the robustness of the calculations, i.e. no singularities. Second, the values were compared with CAD models of a complex optical geometry. Using ray tracing and the CAD Model all intermediate points in the equations were verified, including PI and PT.

Figure 15:
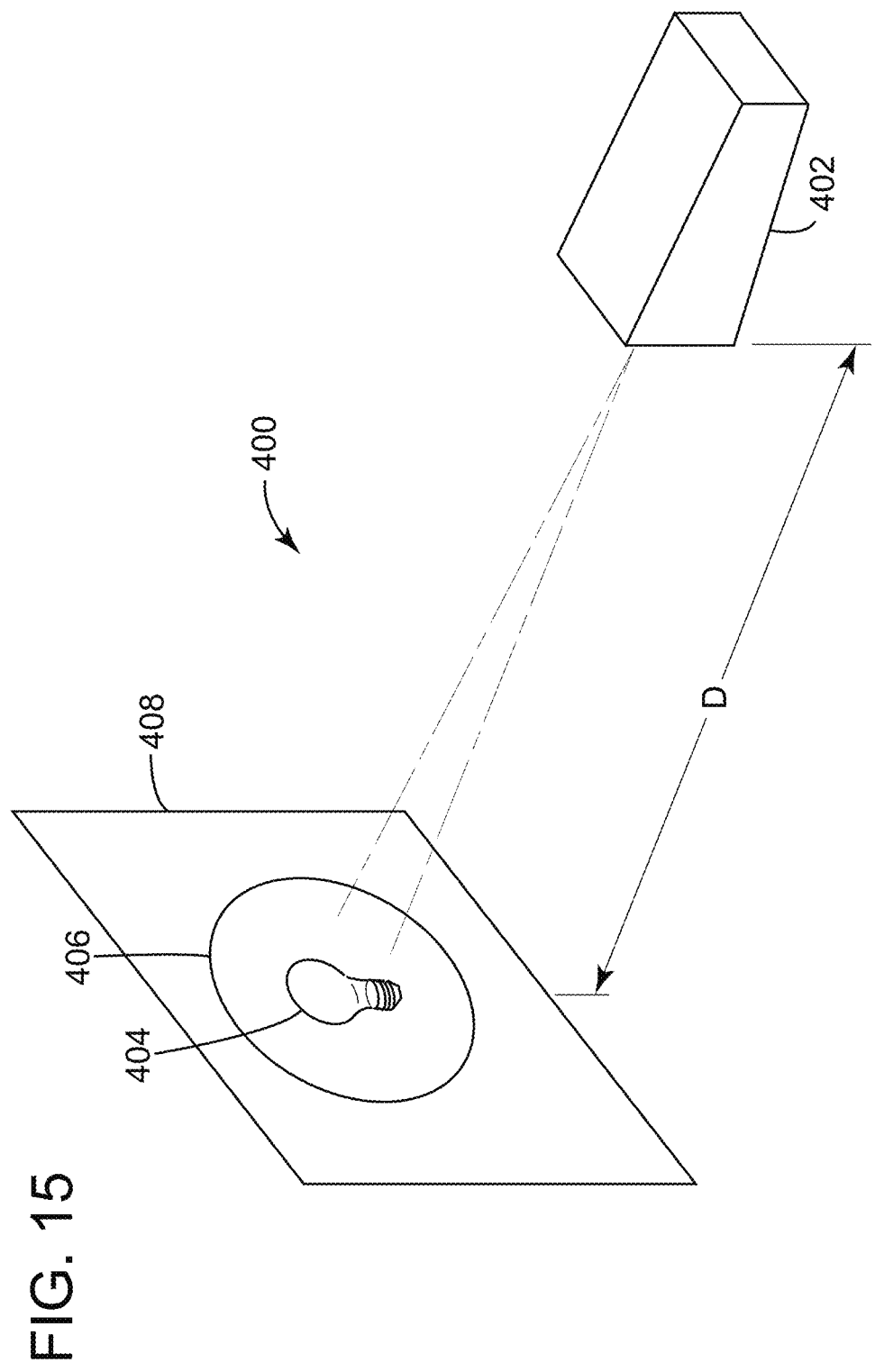
FIG. 15 illustrates an experimental setup to test the range and surface temperature scanner of FIGS. 8-11.

The test apparatus described in FIGS. 8-11 has been evaluated in a laboratory setup 400 as illustrated in FIG. 15, in which a scanner for range and TCP 402 was placed at a known distance D from a high-temperature source 404 (a halogen light bulb) at the center of a circle of highly reflective material 406 to serve as a calibration reference for the range scanner in the device 402. For additional reference, the light bulb 404 and reference circle 406 were separated from the range and TCP scanner 402 by a known distance (D) of 20 m and disposed inside of a rectangular frame 408.

Temperature calibration was made with an extended range black-body source. As noted above, any non-gray body influence that would be in the beam path must be in place during calibration. This included the scanning laser range finders scan window. Thus, final calibration of the device was only done after the TDS-300 scanner was completely assembled. The black body was positioned in front of the scanner at a range of 2.5 m. The aperture of the black body was placed on the centerline of the TCP. Signal amplitudes were observed in the system software as a function of black body temperature. The black body temperature was exercised over a suitable range of temperatures expected in the field, and the resulting data reduced using the two-color pyrometer equation to determine the calibration constants particular to optics, filters, etc. incorporated in any particular device. The TCP equation is given by:

$$T = \frac{AC_2\left[\left(\frac{1}{\lambda_1}\right) - \left(\frac{1}{\lambda_2}\right)\right]}{\ln\frac{I_1}{I_2} - \ln G}, \qquad (12)$$

where $C_2$ is the second radiation constant, $\lambda_1$ and $\lambda_2$ are the wavelengths of operation of the two color pyrometer, and $I_1$ and $I_2$ are the gain-corrected, measured intensities at the two wavelengths. A is a calibration constant required to adjust the slope and offset of the best fit line to the actual versus measured data and G is an optical constant that is varied to account for changes in gain through the pyrometer optics (windows, filters, etc).

Figure 16:
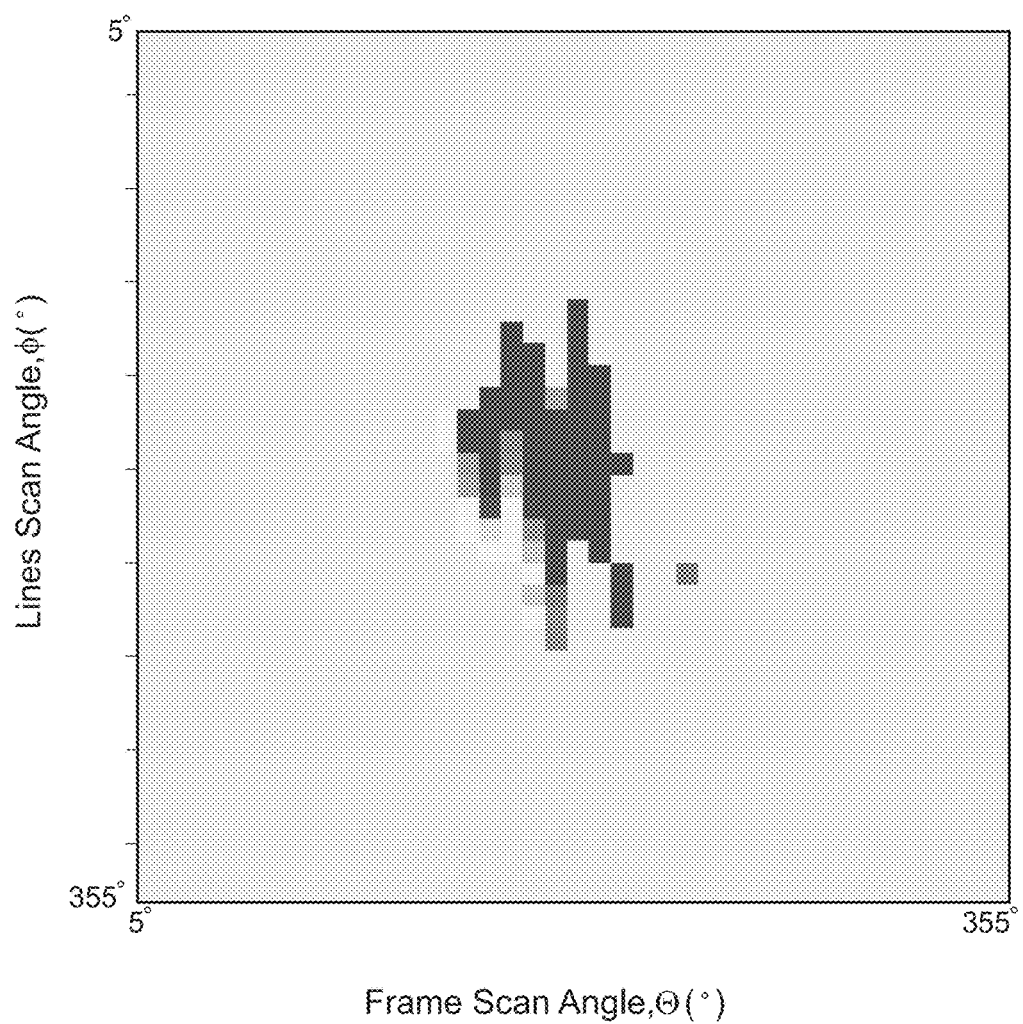
FIG. 16 illustrates temperature measurement results for the experimental setup of FIG. 15 using the range and surface temperature scanner of FIGS. 8-11.
Figure 17:
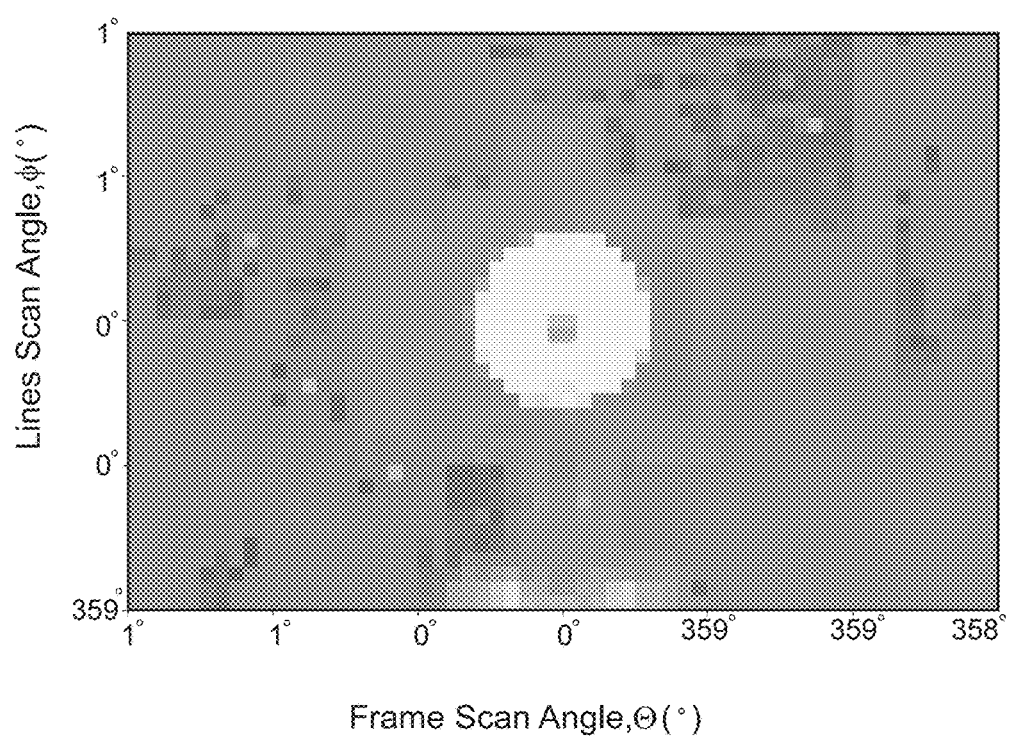
FIG. 17 illustrates range measurement results for the experimental setup of FIG. 15 using the range and surface temperature scanner of FIGS. 8-11.

The apparatus illustrated in FIG. 15 was used to spatially correlate the TCP and the range measurement. The halogen lamp 404 was placed on the centerline of the reflective circle used to calibrate the fast and slow scan encoders of the range measurement. An intensity scan of this apparatus is illustrated in FIG. 16. FIG. 17 also shows the position of the halogen lamp 404 in the range scan as four darkened pixels in the center of the reflective circle. In practice, the range measurement is first centered in on the circular disk in the absence of the halogen lamp. This was done by making 10 scans of the circular surface, fitting a circle to the scans that fall within the highly reflective region of the calibration target, calculating the centroid of the fitted circle, and applying a software correction equivalent to the difference between the centroid's (x,y) position and (0,0). The lamp was then placed at the center of the target, and the pyrometer output interrogated with an oscilloscope to observe the maximum signal. Azimuthal alignment was effected by rotating the pyrometer about an axis normal to the axis of light collection. Elevation alignment was effected by noting the position of the collected data in FIG. 16, and adjusting an offset angle in the scanner firmware until the pyrometer data as reported had an average line scan angle (see FIG. 16) equal to zero. When properly aligned, the centroid of the thermal data obtained by scanning the halogen lamp should be zero in both elevation and azimuthal directions. Note that these conditions were satisfied in the data of FIG. 16.

As noted above, it is important that the two detectors of the TCP are aligned in both azimuthal and elevation directions such that their images in the far field are completely overlapped. In practice, this can be accomplished in the elevation direction using an oscilloscope and noting the degree of overlap between the traces generated for each detector. Alignment in the azimuthal direction is more challenging and requires small rotations of the scanning laser range finder turret while observing the rates of amplitude change of the signals on the oscilloscope. Proper azimuthal alignment has been reached when the two signals at each wavelength decay equally as the imaged collection areas are scanned across the far field light source.

Figure 18:
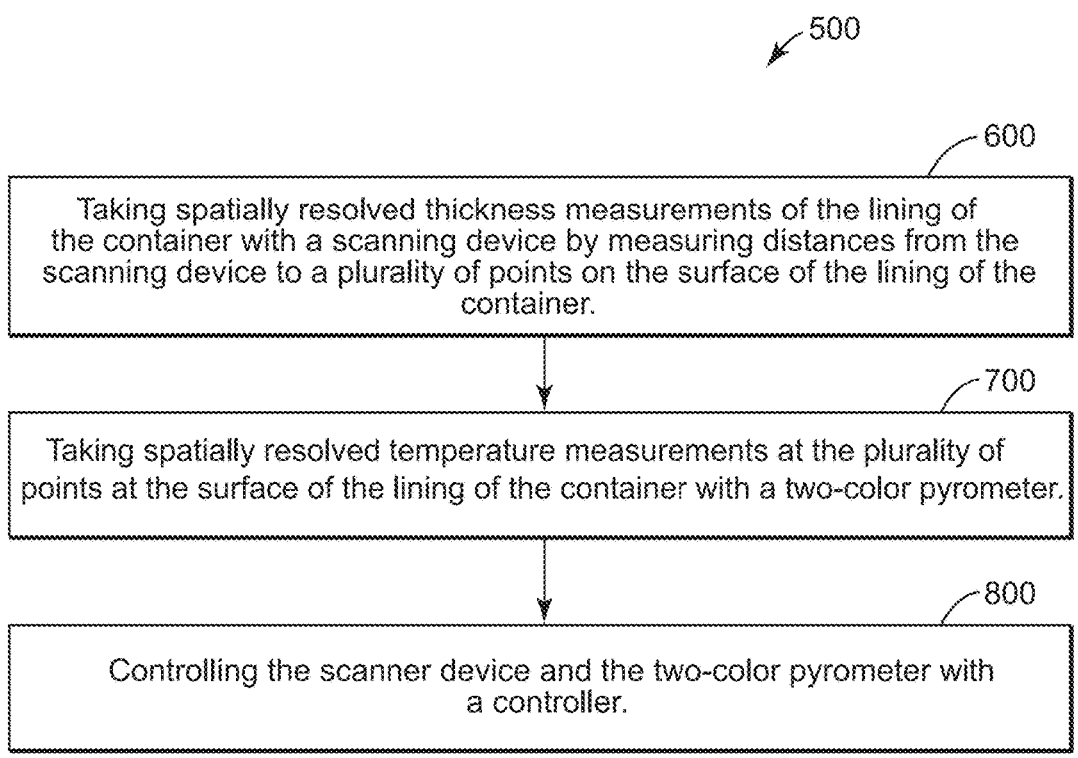
FIG. 18 illustrates a flowchart of a method according to an embodiment of the subject matter disclosed.

According to another exemplary embodiment, a process or method for characterizing the wear of and measuring the temperature of the surface of the lining of a container is disclosed as illustrated in the flowchart shown in FIG. 18. As this process is intended to be as complete as possible, it is noted that not all the steps need to be performed for characterizing the wear of and measuring the temperature of the surface of the lining of the container. In other words, some steps to be described next are optional.

As shown in FIG. 18, the method 500 for characterizing the wear of and measuring the temperature of the surface of the lining of a container includes the steps of, at 600, taking spatially resolved thickness measurements of the lining of the container with a scanning device. As disclosed herein, this scanning device may include a laser, a scanner, scanning optics, a photodetector, and receiver electronics. These spatially resolved thickness measurements of the lining of the container are made by measuring distances from the scanning device to a plurality of points on the surface of the lining of the container and comparing them to reference measurements of the lining.

At step 700, the method 500 further includes taking spatially resolved temperature measurements at substantially the same location of the plurality of points at the surface of the lining of the container with a two-color pyrometer. This two-color pyrometer may include a collection lens, a beam splitter, a first spectral filter having a first wavelength range, a first detector to measure a first intensity of a first portion of light emitted from each point in the plurality of points and filtered by the first spectral filter, a second spectral filter having a second wavelength range, and a second detector to measure a second intensity of a second portion of the light emitted from each point of the plurality of points and filtered by the second spectral filter. Wherein, the surface temperature for each point of the plurality of points is measured by correlating a ratio of the first and second intensities to the surface temperature. Finally, at 800, the measuring of range and surface temperature are controlled using a controller.

As further explained herein, in the method 500, the two-color pyrometer may be collinear or non-collinear with the scanning device. In addition, in some embodiments, the scanner may further include a multi-faceted mirror and the measurement of lining thickness and corresponding surface temperature for each point in the plurality of points uses adjacent facets of the multi-faceted mirror in a non-collinear arrangement. Finally, in the method 500, the data acquisition channels for the scanning device and for the two-color pyrometer may be synchronized and the synchronization timings for the scanning device and the two-color pyrometer may be controlled by an encoder attached to the rotating multi-faceted mirror in the scanner of the scanning device.

Figure 19:
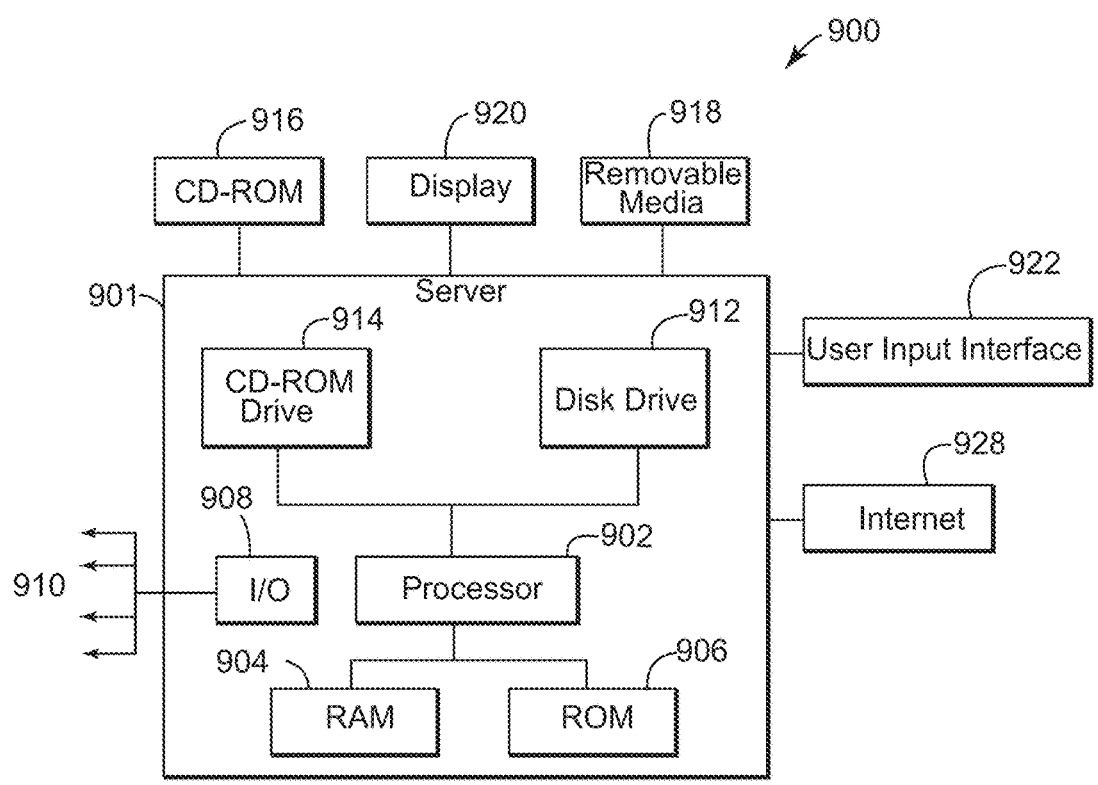
FIG. 19 illustrates a computer system configured to characterize wear of the refractory surface and to measure refractory surface temperature in the container of FIG. 1 according to an embodiment of the subject matter disclosed.

One or more of the steps of the methods comprising the subject matter disclosed may be implemented in a computing system specifically configured to characterize the wear of and measure the temperature of the surface of the lining of a container as explained hereinabove. An example of a representative computing system capable of carrying out operations in accordance with the exemplary embodiments is illustrated in FIG. 19. Hardware, firmware, software or a combination thereof may be used to perform the various steps and operations described herein. In various examples of the subject matter disclosed, the controllers illustrated in FIGS. 2 and 5 individually or in any combination are part of a system containing the illustrated control device or controller in the form of a computing structure that may be used in connection with such a system.

The exemplary computing system 900 suitable for performing the activities described in the exemplary embodiments may include a server 901. Such a server 901 may include a central processor unit (CPU) 902 coupled to a random access memory (RAM) 904 and to a read-only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910 to provide control signals and the like. The CPU 902 carries out a variety of functions as is known in the art, as dictated by software and/or firmware instructions.

The server 901 may also include one or more data storage devices, including a disk drive 912, CD-ROM drives 914, and other hardware capable of reading and/or storing information such as a DVD, etc. In one embodiment, software for carrying out the above-discussed steps may be stored and distributed on a CD-ROM 916, removable memory device 918 or other form of media capable of portably storing information. These storage media may be inserted into, and read by, devices such as the CD-ROM drive 914, the disk drive 912, etc. The server 901 may be coupled to a display 920, which may be any type of known display or presentation screen, such as LCD displays, LED displays, plasma display, cathode ray tubes (CRT), etc. A user input interface 922 is provided, including one or more user interface mechanisms such as a mouse, keyboard, microphone, touch pad, touch screen, voice-recognition system, etc.

The server 901 may be coupled to other computing devices, such as the landline and/or wireless terminals via a network. The server may be part of a larger network configuration as in a global area network (GAN) such as the Internet 928, which allows ultimate connection to the various landline and/or mobile client devices.

The disclosed exemplary embodiments provide apparatuses, methods, and systems for for characterizing the wear of and measuring the temperature of the surface of the lining of a container as well the other uses hereinabove summarized and appreciated by those of ordinary skill in the applicable arts after consideration of the subject matter disclosed. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments might be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. Finally, in the claims, any means-plus-function clause is intended to cover the structures described herein as performing the recited function and not only structural equivalents, but also equivalent structures.

What is claimed is:

1. An apparatus to characterize a wear and measure a temperature of a surface of a lining of a container, said apparatus, comprising:
    a scanning device having a laser, a scanner, scanning optics, a photodetector, and receiver electronics, the scanning device being configured to make spatially resolved thickness measurements of the lining of the container by measuring distances from the scanning device to a plurality of points on the surface of the lining of the container;
    a two-color pyrometer configured to measure the temperature at the plurality of points on the surface of the lining of the container, the two-color pyrometer having a collection lens, a beam splitter, a first spectral filter having a first wavelength spectral range, a first detector to measure a first intensity of a first portion of light emitted from the plurality of points and filtered by the first spectral filter, a second spectral filter having a second wavelength spectral range, and a second detector to measure a second intensity of a second portion of the light emitted from the plurality of points and filtered by the second spectral filter, wherein the surface temperature for each point of the plurality of points is measured by correlating a ratio of the first and second intensities to the surface temperature; and
    a controller to control operation of the scanning device and the two-color pyrometer, wherein the controller correlates locations of each scanned point in the plurality of points with corresponding points in the plurality of points where temperature is measured by the two-color pyrometer.

2. The apparatus according to claim 1, the scanner further comprises a multi-faceted mirror.

3. The apparatus according to claim 2, wherein the two-color pyrometer is collinear with the scanning device.

4. The apparatus according to claim 3, wherein measurements of lining thickness and corresponding surface temperature use the same facet of the multi-faceted mirror.

5. The apparatus according to claim 2, wherein the two-color pyrometer is non-collinear with the scanning device.

6. The apparatus according to claim 5, wherein measurements of lining thickness and corresponding surface temperature use adjacent facets of the multi-faceted mirror.

7. The apparatus according to claim 1, further comprising:
    a spatial filter in the collection lens of the two-color pyrometer.

8. The apparatus according to claim 7, wherein the spatial filter is an optical pin hole or a detector having a diameter of about 100 microns or less.

9. The apparatus according to claim 1, wherein data acquisition channels for the scanning device and for the two-color pyrometer are optically different from one another.

10. The apparatus according to claim 9, wherein the data acquisition channels are synchronized.

11. The apparatus according to claim 10, wherein data acquisition channels are gated.

12. The apparatus according to claim 11, wherein a synchronization timing for the scanning device and a synchronization timing for the two-color pyrometer are controlled by an encoder attached to a rotating multi-faceted mirror in the scanner of the scanning device.

13. The apparatus according to claim 12, wherein the synchronization timing for the scanning device and the synchronization timing for the two-color pyrometer are independently adjustable.

14. A method for characterizing a wear and measuring a temperature of a surface of a lining of a container, said method, comprising:

taking spatially resolved thickness measurements of the lining of the container with a scanning device including a laser, a scanner, scanning optics, a photodetector, and receiver electronics, the scanning device making the spatially resolved thickness measurements of the lining of the container by measuring distances from the scanning device to a plurality of points on the surface of the lining of the container;

taking spatially resolved temperature measurements at the plurality of points on the surface of the lining of the container with a two-color pyrometer, the two-color pyrometer including a collection lens, a beam splitter, a first spectral filter having a first wavelength range, a first detector to measure a first intensity of a first portion of light emitted from each point in the plurality of points and filtered by the first spectral filter, a second spectral filter having a second wavelength range, and a second detector to measure a second intensity of a second portion of the light emitted from each point of the plurality of points and filtered by the second spectral filter, wherein the surface temperature for each point of the plurality of points is measured by correlating a ratio of the first and second intensities to the surface temperature; and controlling operation of the scanning device and the two-color pyrometer by a controller, wherein the controlling further comprises correlating locations on the surface of each scanned point in the plurality of points to corresponding locations on the surface of the plurality of points where temperature is measured by the two-color pyrometer.

15. The method according to claim 14, wherein the taking of thickness measurements and temperature measurements use the same facet of a multi-facet mirror in the scanner.

16. The method according to claim 14, wherein the taking of thickness measurements and temperature measurements use adjacent facets of a multi-facet mirror in the scanner.

17. The method according to claim 14, wherein the taking of thickness measurements and temperature measurements use separate data acquisition channels that are synchronized.

18. The method according to claim 17, further comprising:

controlling a synchronization timing for the scanning device and a synchronization timing for the two-color pyrometer by an encoder attached to a rotating multi-faceted mirror in the scanner of the scanning device.

* * * * *